(12) United States Patent
Lee et al.

(10) Patent No.: US 11,960,289 B2
(45) Date of Patent: Apr. 16, 2024

(54) MOVING ROBOT AND MOVING ROBOT SYSTEM

(71) Applicant: LG ELECTRONICS INC., Seoul (KR)

(72) Inventors: Jaehoon Lee, Seoul (KR); Kyuchun Choi, Seoul (KR); Jongjin Woo, Seoul (KR); Dongseong Kim, Seoul (KR); Hyungsub Kim, Seoul (KR); Seungin Shin, Seoul (KR); Kyungman Yu, Seoul (KR); Jaehoon Jeong, Seoul (KR); Dongkyun Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 805 days.

(21) Appl. No.: 17/045,537

(22) PCT Filed: Apr. 5, 2019

(86) PCT No.: PCT/KR2019/004060
§ 371 (c)(1),
(2) Date: Oct. 6, 2020

(87) PCT Pub. No.: WO2019/194634
PCT Pub. Date: Oct. 10, 2019

(65) Prior Publication Data
US 2021/0096574 A1 Apr. 1, 2021

Related U.S. Application Data

(60) Provisional application No. 62/653,567, filed on Apr. 6, 2018.

(30) Foreign Application Priority Data

Apr. 5, 2019 (KR) .................. 10-2019-0040040

(51) Int. Cl.
*G05D 1/02* (2020.01)
*A01D 34/00* (2006.01)
(Continued)

(52) U.S. Cl.
CPC ......... *G05D 1/0219* (2013.01); *A01D 34/008* (2013.01); *A01D 34/86* (2013.01);
(Continued)

(58) Field of Classification Search
CPC ......... G05D 2201/0208; G05D 1/0219; A01D 34/86
See application file for complete search history.

(56) References Cited

U.S. PATENT DOCUMENTS 11,274,929 B1 * 3/2022 Afrouzi ............... G05D 1/0219
2017/0020064 A1 * 1/2017 Doughty ............. G05D 1/0044
(Continued)

FOREIGN PATENT DOCUMENTS

JP 2014-187951 A 10/2014
JP 2018-014963 A 2/2018
(Continued)

OTHER PUBLICATIONS

PCT International Search Report in Application No. PCT/KR2019/004060 dated Aug. 5, 2019 (3 pages).
(Continued)

*Primary Examiner* — Amelia Vorce
(74) *Attorney, Agent, or Firm* — Birch, Stewart, Kolasch & Birch, LLP

(57) ABSTRACT

The present disclosure provides a moving robot including a body which forms an appearance, a traveler which moves the body with respect to a traveling surface in a traveling area, a sensing unit which acquires environment information of the traveling area, and a controller which sets a parameter tailored to the traveling area according to the environment
(Continued)

information and performs pattern traveling of the traveling area. Accordingly, even when information on an environment in which the moving robot is installed is not obtained from a manufacture in advance, the moving robot can directly obtain information on the corresponding environment and set an optimum parameter according to the environment to increase efficiency.

14 Claims, 16 Drawing Sheets

(51) Int. Cl.
*A01D 34/86* (2006.01)
*A01D 101/00* (2006.01)
*B60L 53/16* (2019.01)
*B60L 53/36* (2019.01)
*G05D 1/00* (2006.01)

(52) U.S. Cl.
CPC .............. *B60L 53/16* (2019.02); *B60L 53/36* (2019.02); *G05D 1/0088* (2013.01); *G05D 1/0214* (2013.01); *G05D 1/0225* (2013.01); *G05D 1/0259* (2013.01); *A01D 2101/00* (2013.01); *B60L 2200/40* (2013.01); *G05D 2201/0208* (2013.01)

(56) References Cited

U.S. PATENT DOCUMENTS

| | | | | |
|---|---|---|---|---|
| 2018/0352735 | A1* | 12/2018 | Balutis | G05D 1/0016 |
| 2019/0113928 | A1* | 4/2019 | Uemura | G05D 1/0088 |
| 2019/0230850 | A1* | 8/2019 | Johnson | A01D 75/006 |
| 2019/0231162 | A1* | 8/2019 | Lu | A47L 9/2852 |
| 2019/0278269 | A1* | 9/2019 | He | A01G 25/09 |
| 2019/0384316 | A1* | 12/2019 | Qi | G05D 1/0221 |
| 2020/0363796 | A1* | 11/2020 | Muro | G05D 1/0088 |
| 2021/0116911 | A1* | 4/2021 | Pjevach | B60L 50/66 |
| 2021/0289695 | A1* | 9/2021 | Grufman | G05D 1/0055 |
| 2021/0311484 | A1* | 10/2021 | Lee | G01C 21/3837 |

FOREIGN PATENT DOCUMENTS

| | | | | |
|---|---|---|---|---|
| KR | 10-2010-0118454 | | 11/2010 | |
| KR | 10-2015-0040556 | | 4/2015 | |
| KR | 10-2016-0128126 | | 11/2016 | |
| KR | 10-2017-0123512 | | 11/2017 | |
| KR | 20160128124 A | * | 11/2023 | ............. A01D 34/84 |
| WO | WO-2017133638 A1 | * | 8/2017 | ............. A01D 34/00 |

OTHER PUBLICATIONS

European Search Report, dated Oct. 15, 2021, issued in European Patent Application No. 19780808.2 (14 pages).

Tsubata, Kensuke et al.; "Recognition of Lawn Information for Mowing Robots"; Proceedings of the 4$^{th}$ International Conference on Autonomous Robots and Agents, Feb. 10, 2009 (6 pages).

* cited by examiner

MOVING ROBOT AND MOVING ROBOT SYSTEM

BACKGROUND OF THE DISCLOSURE

Technical Field

The present disclosure relates to a moving robot and a moving robot system which performs a slope compensation and a bumper sensitivity adjustment according to environmental information in pattern traveling of the moving robot.

Background Information

A robot has been developed for industrial use and has been responsible for a portion of factory automation. In recent years, a field of application of the robot has been further expanded, a medical robot, an aerospace robot, or the like has been developed, and a home robot that can be used in a general home is also manufactured. Among these robots, a robot capable of traveling by itself is called a moving robot. A typical example of the moving robot used in an outdoor environment of a home is a lawn mowing robot.

In a case of a moving robot autonomously traveling indoors, a movable area is limited by a wall or furniture, but in a case of a mobile robot autonomously traveling outdoors, there is a need to set a movable area in advance. In addition, there is a need to limit the movable area so that the lawn mowing robot travels in an area where lawn is planted.

In the related art (Korean Patent Publication Laid-Open No. 2015-0125508), a wire is buried to set an area in which a lawn mower robot is to be moved, and the lawn mower robot senses a magnetic field formed by a current flowing through the wire and can move within an area set by the wire.

At this time, in a case of the lawn mower robot, there is a need to customize the lawn mower robot so as to achieve optimal performance according to an installation environment of the lawn mower robot.

That is, since a manufacturer cannot obtain information on an environment in which each lawn mower robot is installed in advance and cannot set the parameters of each sensor accordingly, it is necessary for each moving robot directly to obtain environment information of a corresponding position directly and set a parameter according to the obtained environment information.

Specifically, it is necessary to adjust sensitivity of the bumper according to a density of lawn and a height of the lawn, and if the sensitivity is not adjusted, map recognition of the corresponding position and a lawn mowing work may not be performed appropriately.

In addition, in relation to the slope of the corresponding position, when the slope of the corresponding position is not compensated, effects of the pattern traveling may not be exerted at all due to a frictional force in a conventional sloped terrain.

The related art (United State Patent Publication No. US20150366130A1) discloses that, when a lawn mower robot is on a slope, a speed of the robot is changed according to a slope angle.

However, in the case of the related art, a speed change that the user does not want may occur by performing the change at the speed determined according to the slope angle without a command for a parameter change from the user.

The unexpected change of the state of the lawn mower robot may be offensive to a user.

SUMMARY

A first object of the present disclosure is to provide a moving robot capable of setting bumper sensitivity according to environmental information of the moving robot.

A second object of the present disclosure is to provide a moving robot capable of pattern traveling by adjusting a value for compensating a corresponding gradient according to the gradient of an environment in which the moving robot is installed so as to compensate the gradient.

A third subject of the present disclosure is to provide a moving robot capable of commanding the pattern traveling at a desired intensity and period of the user by providing information to the user so that the user controls bumper sensitivity and a gradient according to an environment in which the moving robot is placed through a user terminal.

A fourth object of the present disclosure is to provide a moving robot capable of performing traveling in a zigzag pattern by compensating for a frictional force even when the frictional force is generated due to a sloped terrain of the moving robot.

According to the present disclosure, there is provided a moving robot including: a body which forms an appearance; a traveler which moves the body with respect to a traveling surface in a traveling area; a sensing unit which acquires environment information of the traveling area; and a controller which sets a parameter tailored to the traveling area according to the environment information and performs pattern traveling of the traveling area.

The controller may perform the traveler so that the traveler performs pattern traveling in a zigzag mode in which the moving robot alternately travels a major axis and a minor axis.

The controller may include information on a lawn condition in the traveling area and slope information of the traveling surface, as the environment information.

The controller may include information on a lawn length and a lawn density, as information on the lawn condition.

The controller may set a parameter for bumper sensitivity according to the information on the lawn condition.

The controller may set the bumper sensitivity higher as the lawn density increases or the lawn length increases.

The controller may perform slope compensation so that the moving robot travels in a slope upward direction on the traveling surface based on the slope information.

The controller may largely perform the slope compensation when the slope of the traveling surface is large according to the slope information.

The controller may set angles of the major axis and the minor axis larger as the slope compensation increases.

The controller may control the traveler in the traveling area to perform a preceding traveling to obtain the environment information.

The controller may receive set values for the slope compensation and the bumper sensitivity from the outside, and may perform setting according to the received set values.

Meanwhile, according to the present disclosure, there is provided a moving robot system including: a boundary wire which defines a traveling area; a moving robot which includes a body which forms an appearance, a traveler which moves the body with respect to a traveling surface in a traveling area, a sensing unit which acquires environment information of the traveling area, and a controller which sets a parameter tailored to the traveling area according to the environment information and performs pattern traveling of the traveling area; and a user terminal which transmits information on the parameter value to the moving robot.

The controller may control the traveler so that the traveler performs pattern traveling in a zigzag mode in which the moving robot alternately travels a major axis and a minor axis.

The user terminal may store an application for the moving robot.

The controller may transmit information on the traveling area to the user terminal.

The information on the traveling area includes the environment information and gradient information on the sloped surface.

The user terminal may receive simulation of a pattern path according to a value of the slope compensation from the moving robot.

The moving robot system may further include a docking device to which the moving robot is docked to be charged, in which one end of the traveling area is disposed to be adjacent to the docking device.

According to the present disclosure, even when information on an environment in which the moving robot is installed is not obtained from a manufacture in advance, the moving robot can directly obtain information on the corresponding environment and set an optimum parameter according to the environment to increase efficiency.

Moreover, it is possible to set a bumper sensitivity according to a condition of lawn in a corresponding environment, and it is possible to set a compensation value according to a gradient of a sloped terrain to provide an optimum lawn mower robot.

In addition, parameters of the bumper sensitivity and gradient compensation can be directly from a user, the lawn mowing can be performed to satisfy a desired level of the user, and a more customized work can be provided.

DESCRIPTION OF EXEMPLARY EMBODIMENTS

Figure 1:
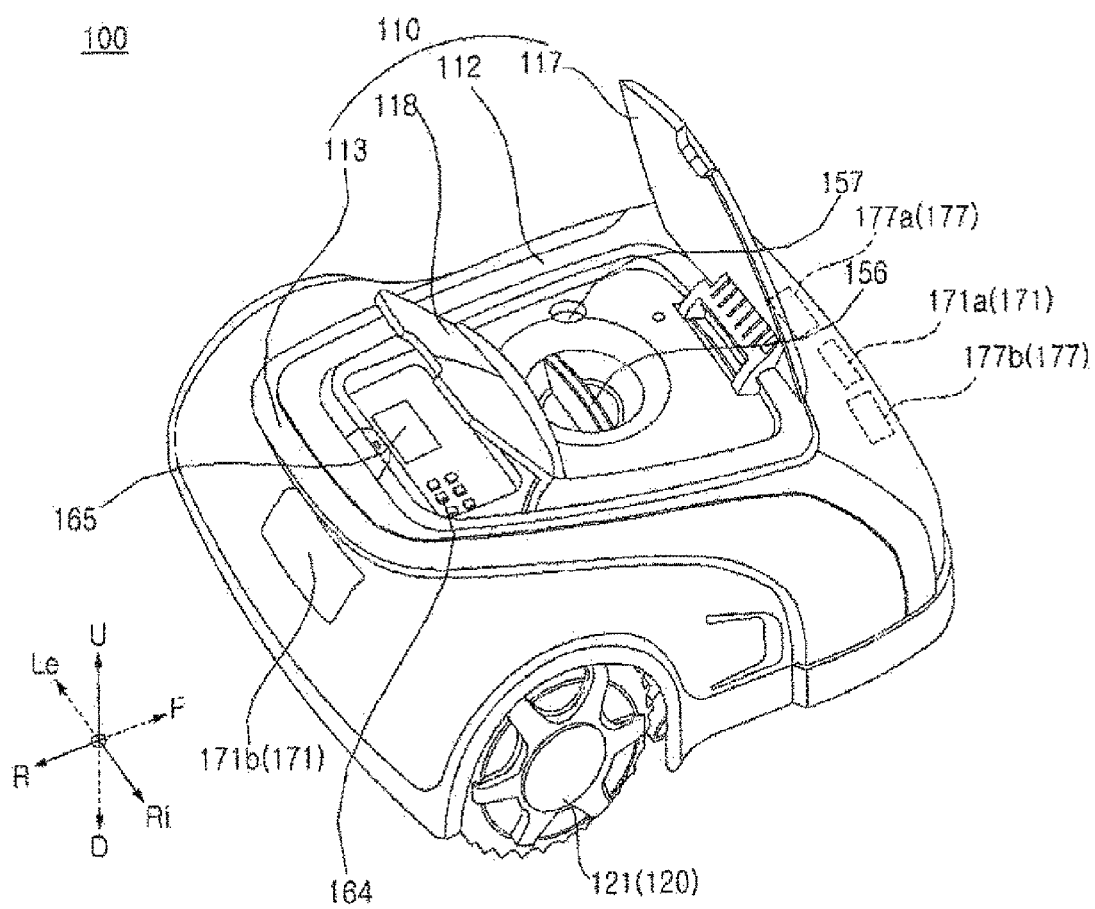
FIG. 1 is a perspective view illustrating a moving robot 100 according to an embodiment of the present disclosure.
Figure 2:
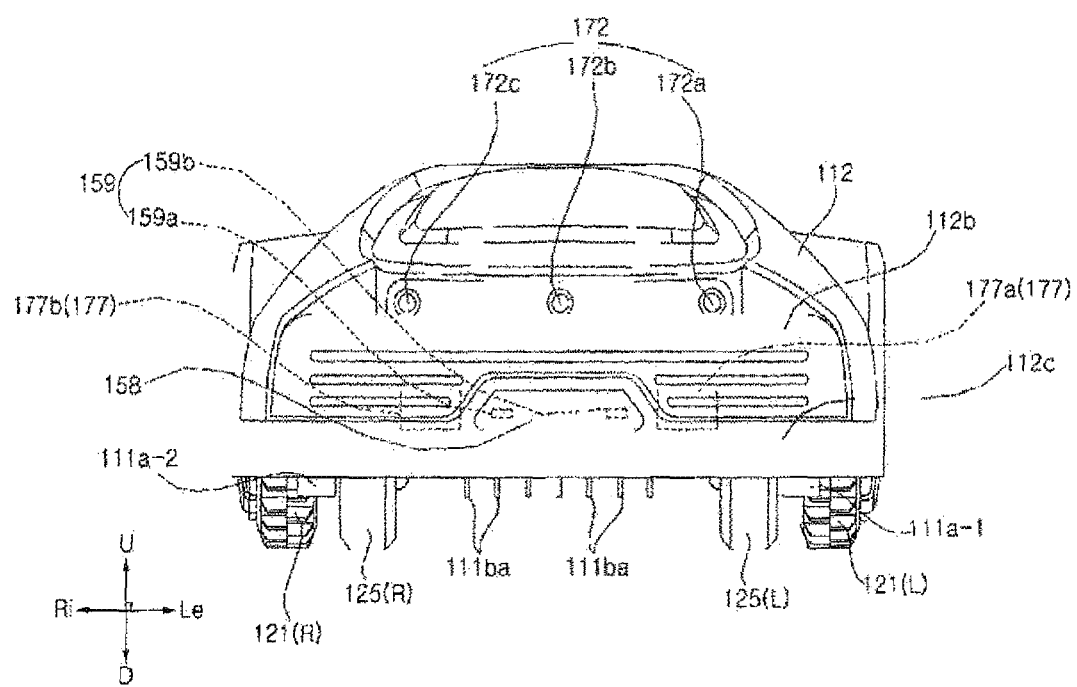
FIG. 2 is an elevational view when viewing a front surface of the moving robot of FIG. 1.
Figure 3:
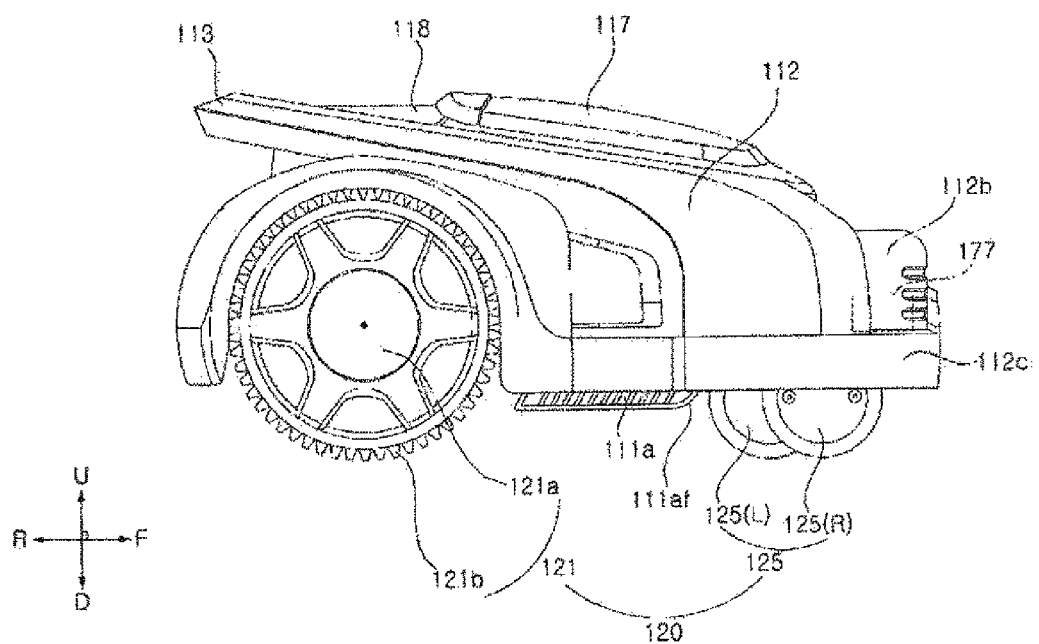
FIG. 3 is an elevational view when viewing a right surface of the moving robot of FIG. 1.
Figure 4:
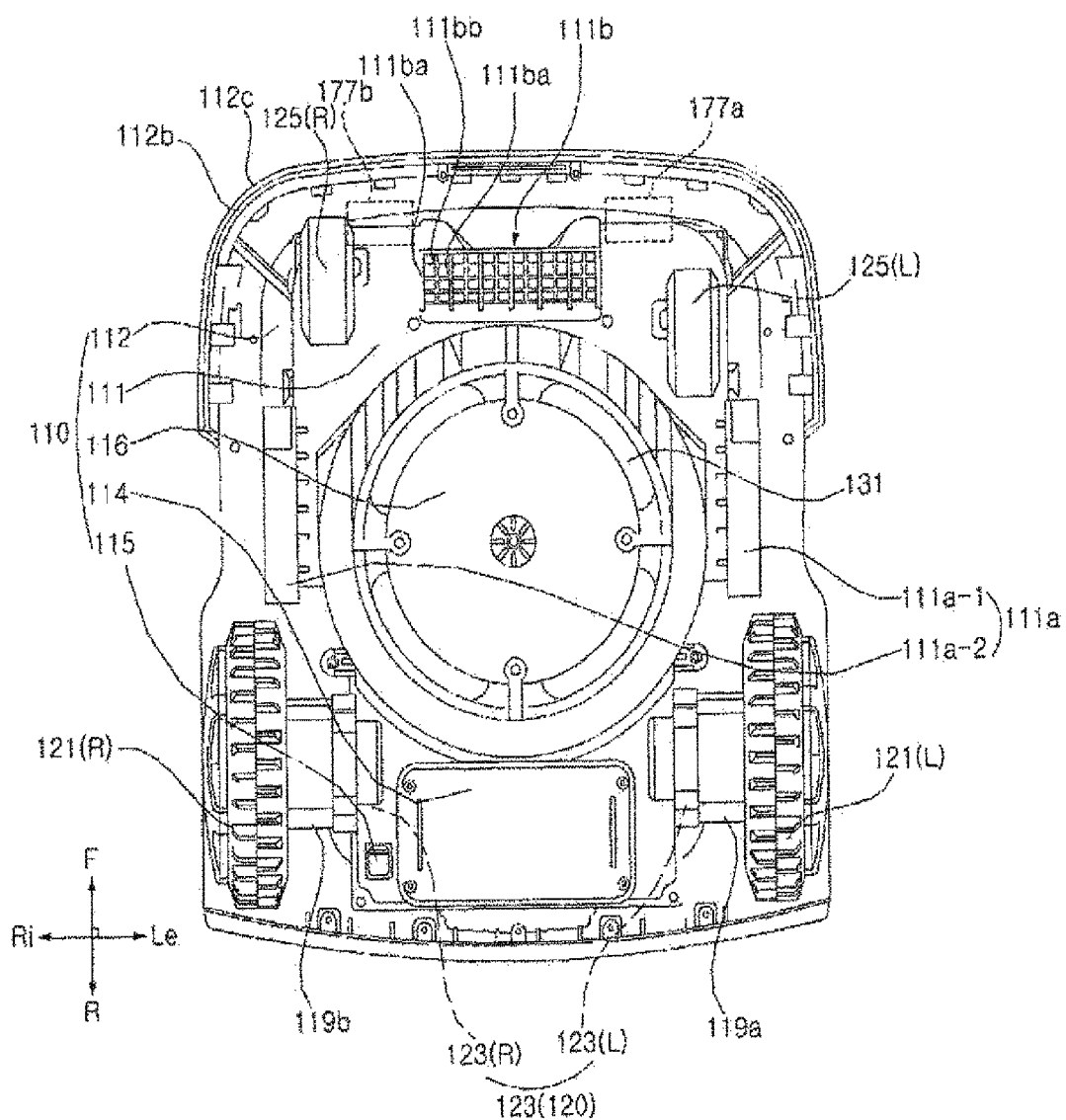
FIG. 4 is an elevational view when viewing a bottom surface of the moving robot of FIG. 1.

Expressions referring to directions such as "front(F)/rear(R)/left(Le)/right(Ri)/up (U)/down (D)" mentioned below are defined as indicated in the drawings. However, the expressions are only to explain the present disclosure so that the present disclosure can be clearly understood, and the directions may be differently defined depending on a criterion.

Use of terms "first and second" in front of components mentioned below is only to avoid confusion of the referred component, and is independent of an order, importance, or master/slave relationship between the components. For example, an embodiment including only a second component without a first component can be implemented.

In the drawings, a thickness or a size of each component is exaggerated, omitted, or schematically illustrated for convenience and clarity of the explanation. The size and area of each component do not entirely reflect the actual size or area.

Moreover, an angle and a direction mentioned in describing a structure of the present disclosure are based on those described in the drawings. In description of a structure in the specification, if a reference point and a positional relationship with respect to the angle are not explicitly mentioned, reference is made to the related drawings.

Hereinafter, a lawn mowing robot 100 of moving robots will be described as an example with reference to FIGS. 1 to 6, but the present disclosure is not limited thereto.

Referring to FIGS. 1 to 4, the moving robot 100 includes a body 110 which forms an appearance. The body 110 forms an interior space. The moving robot 100 includes a traveler 120 which moves the body 110 with respect to a traveling surface. The moving robot 100 includes an operator 130 which performs a predetermined work.

The body 110 includes a frame 111 to which the driving motor module 123 to be described later is fixed. A blade motor 132 to be described later is fixed to the frame 111. The frame 111 supports a battery to be described later. The frame 111 provides a skeleton structure which supports various other parts. The frame 111 is supported by an auxiliary wheel 125 and a driving wheel 121.

The body 110 includes a side blocking portion 111a for preventing a finger of a user from entering a blade 131 from both sides of the blade 131. The side blocking portion 111a is fixed to the frame 111. The side blocking portion 111a is disposed to protrude downward compared to a bottom surface of the other portion of the frame 111. The side blocking portion 111a is disposed to cover an upper portion of a space between the driving wheel 121 and the auxiliary wheel 125.

A pair of side blocking portions 111a-1 and 111a-2 are disposed right and left with the blade 131 therebetween. The side blocking portion 111a is disposed to be spaced apart at a predetermined distance from the blade 131.

A front surface 111af of the side blocking portion 111a is formed to be round. The front surface 111af forms a surface which is bent upward to be rounded forward from a bottom surface of the side blocking portion 111a. By using the shape of the front surface 111af, when the moving robot 100 moves forward, the side blocking portion 111a can easily ride over a lower obstacle below a predetermined reference.

The body 110 includes a front blocking portion 111b for preventing the finger of the user from entering the blade 131 in front of the blade 131. The front blocking portion 111b is fixed to the frame 111. The front blocking portion 111b is disposed to cover a portion of an upper portion of a space between the pair of auxiliary wheels 125L and 125R.

The front blocking portion 111b includes a protruding rib 111ba protruding downward compared to a bottom surface of the other portion of the frame 111. The protruding rib 111ba extends in a front-rear direction. An upper end portion of the protruding rib 111ba is fixed to the frame 111, and a lower end portion of the protruding rib 111ba forms a free end.

A plurality of protruding ribs 111ba may be spaced apart in a right-left direction. The plurality of protruding ribs 111ba may be disposed parallel to each other. A gap is formed between two adjacent protruding ribs 111ba.

A front surface of the protruding rib 111ba is formed to be round. The front surface of the protruding rib 111ba forms a surface which is bent upward to be rounded forward from a bottom surface of the protruding rib 111ba. By using the shape of the front surface of the protruding rib 111ba, when the moving robot 100 moves forward, the protruding rib 111ba 111a can easily ride over a lower obstacle below a predetermined reference.

The front blocking portion 111b includes an auxiliary rib 111bb to assist stiffness. The auxiliary rib 111bb for reinforcing stiffness of the front blocking portion 111b is disposed between upper end portions of the two adjacent protruding ribs 111ba. The auxiliary rib 111bb may be formed to protrude downward and extend in a lattice shape.

A caster (not illustrated) for rotatably supporting the auxiliary wheel 125 is disposed on the frame 111. The caster is rotatably disposed with respect to the frame 111. The caster is rotatably provided about a vertical axis. The caster is disposed below the frame 111. A pair of casters corresponding to the pair of auxiliary wheels 125 is provided.

The body 110 includes a case 112 which covers the frame 111 from above. The case 112 forms an upper surface and front/rear/left/right surfaces of the moving robot 100.

The body 110 may include a case connector (not illustrated) which fixes the case 112 to the frame 111. The case 112 may be fixed to an upper end of the case connector. The case connector may be disposed to be movable in the frame 111. The case connector may be disposed to be movable only in an up-down direction with respect to the frame 111. The case connector may be provided to be able to be movable only within a predetermined range. The case connector is movable integrally with the case 112. Accordingly, the case 112 is movable relative to the frame 111.

The body 110 includes a bumper 112b disposed in a front portion thereof. The bumper 112b absorbs an impact when the bumper 112b comes in contact with an external obstacle. In a front surface portion of the bumper 112b, a bumper groove is formed, which is recessed rearward and formed to be elongated in the right-left direction. A plurality of bumper grooves may be disposed spaced apart in the up-down direction. A lower end of the protruding rib 111ba is disposed at a lower position than a lower end of the auxiliary rib 111bb.

In the bumper 112b, a front surface and right and left surfaces are formed to be connected to each other. The front surface and the side surfaces of the bumper 112b are connected to each other to be rounded.

The body 110 may include a bumper auxiliary portion 112c which is disposed to surround an outer surface of the bumper 112b. The bumper auxiliary part 112c is coupled to the bumper 112b. The bumper auxiliary portion 112c surrounds a lower portion and lower portions of right and left sides of a front surface of the bumper 112b. The bumper auxiliary portion 112c may cover the front surface and lower half portions of the right and left sides of the bumper 112b.

A front end surface of the bumper auxiliary portion 112c is disposed in front of a front end surface of the bumper 112b. The bumper auxiliary portion 112c forms a surface protruding from a surface of the bumper 112b.

The bumper auxiliary portion 112c may be formed of a material which is advantageous for shock absorption, such as rubber. The bumper auxiliary part 112c may be formed of a flexible material.

The frame 111 may include a movable fixing portion (not illustrated) to which the bumper 112b is fixed. The movable fixing portion may be disposed to protrude upward from the frame 111. The bumper 112b may be fixed to an upper end portion of the movable fixing portion.

The bumper 112b may be disposed to be movable within a predetermined range with respect to the frame 111. The bumper 112b is fixed to the movable fixing portion and can move integrally with the movable fixing portion.

The movable fixing portion may be disposed to be movable with respect to the frame 111. The movable fixing portion may be provided so that the movable fixing portion is rotatable within a predetermined range with respect to the frame 111 about a virtual rotation axis. Accordingly, the bumper 112b may be rotatably provided integrally with the movable fixing portion with respect to the frame 111.

The body 110 includes a handle 113. The handle 113 may be disposed on a rear side of the case 112.

The body 110 includes a battery input portion 114 through which a battery is taken in or out. The battery input portion 114 may be disposed on a bottom surface of the frame 111. The battery input unit 114 may be disposed on a rear side of the frame 111.

The body 110 includes a power switch 115 for turning on/off power of the moving robot 100. The power switch 115 may be disposed on the bottom surface of the frame 111.

The body 110 includes a blade protector 116 which covers a lower side of a central portion of the blade 131. The blade protector 116 is provided so that a blade of a centrifugal portion of the blade 131 is exposed, but the central portion of the blade 131 is covered.

The body 110 includes a first opening/closing unit 117 which opens and closes a portion where a height adjuster 156 and a height display 157 are disposed. The first opening and closing portion 117 is hinged to the case 112 and is provided to enable opening and closing operations. The first opening/closing portion 117 is disposed on an upper surface of the case 112.

The first opening/closing portion 117 is formed in a plate shape, and covers upper sides of the height adjuster 156 and the height display 157 in a closed state.

The body 110 includes a second opening/closing unit 118 for opening and closing a portion where a display module 165 and an input unit 164 are disposed. The second opening/closing unit 118 is hinged to the case 112 and is provided to enable opening and closing operations. The second opening/closing portion 118 is disposed on the upper surface of the case 112. The second opening/closing unit 118 is disposed behind the first opening/closing unit 117.

The second opening/closing unit 118 is formed in a plate shape, and covers the display module 165 and the input unit 164 in a closed state.

An openable angle of the second opening/closing unit 118 is preset to be smaller than an openable angle of the first opening/closing unit 117. Accordingly, even in an open state of the second opening/closing unit 118, the user can easily open the first opening/closing unit 117, and the user can easily operate the height adjuster 156. In addition, even in the open state of the second opening/closing unit 118, the user can visually check a content of the height display 157.

For example, the openable angle of the first opening/closing unit 117 may be provided to be about 80 to 90° based on the closed state. For example, an openable angle of the second opening/closing unit 118 may be provided to be about 45 to 60° based on the closed state.

In the first opening/closing unit 117, a rear end thereof is raised upward with a front end thereof as a center, and thus, the first opening/closing unit 117 is opened. Moreover, in the second opening/closing unit 118, a rear end thereof is raised upward with a front end thereof as a center, and thus, the second opening/closing unit 118 is opened. Accordingly, the user can open and close the first opening/closing unit 117 and the second opening/closing unit 118 from a rear side of the lawn mowing robot 100, which is a safe area even when the lawn mowing robot 100 moves forward. In addition, the opening operation of the first opening/closing unit 117 and the opening operation of the second opening/closing unit 118 may be prevented from interfering with each other.

The first opening/closing unit 117 may be provided to be rotatable with respect to the case 112, about a rotation axis extending in the right-left direction on the front end of the first opening/closing unit 117. The second opening/closing unit 118 may be provided to be rotatable with respect to the case 112, about a rotation axis extending in a right-left direction on the front end of the second opening/closing unit 118.

The body 110 may include a first motor housing 119a accommodating a first driving motor 123(L) therein, and a second motor housing 119b accommodating the second driving motor 123(R) therein. The first motor housing 119a may be fixed to a left side of the frame 111, and the second motor housing 119b may be fixed to a right side of the frame 111. A right end of the first motor housing 119a is fixed to the frame 111. A left end of the second motor housing 119b is fixed to the frame 111.

The first motor housing 119a is formed in a cylindrical shape forming a height from side to side. The second motor housing 119b is formed in a cylindrical shape forming a height from side to side.

The traveler 120 includes a drive wheel 121 which is rotated by a driving force of the drive motor module 123. The traveler 120 may include at least one pair of drive wheels 121 which is rotated by the driving force of the drive motor module 123. The driving wheel 121 includes a first wheel 121(L) and a second wheels 121(R) provided on the left and right sides so as to be independently rotatable. The first wheel 121(L) is disposed on the left side, and the second wheel 121(R) is disposed on the right side. The first wheel 121(L) and the second wheel 121(R) are spaced apart from side to side. The first wheel 121(L) and the second wheel 121(R) are disposed on a lower rear side of the body 110.

The first wheel 121(L) and the second wheel 121(R) are provided to be rotatable independently so that the body 110 can rotate and move forward with respect to the ground. For example, when the first wheel 121(L) and the second wheel 121(R) rotate at the same rotational speed, the body 110 may move forward with respect to the ground. For example, when the rotational speed of the first wheel 121(L) is faster than the rotational speed of the second wheel 121(R) or when a rotational direction of the first wheel 121(L) and a rotational direction of the second wheel 121(R) are different from each other, the body 110 may rotate with respect to the ground.

The first wheel 121(L) and the second wheel 121(R) may be formed larger than the auxiliary wheel 125. A shaft of the first driving motor 123 (L) may be fixed to a center portion of the first wheel 121(L), and a shaft of the second driving motor 123(R) may be fixed to a center portion of the second wheel 121(R).

The driving wheel 121 includes a wheel outer peripheral portion 121b which is in contact with the ground. For example, the wheel outer portion 121b may be a tire. A plurality of protrusions for increasing a frictional force with the ground may be formed on the wheel outer peripheral portion 121b.

The driving wheel 121 may include a wheel frame (not illustrated) which fixes the wheel outer peripheral portion 121b and receives power from the motor 123. The shaft of the motor 123 is fixed to a center portion of the wheel frame, and thus, a rotational force can be transmitted to the wheel frame. The wheel outer peripheral portion 121b is disposed to surround a periphery of the wheel frame.

The driving wheel 121 includes a wheel cover 121a covering an outer surface of the wheel frame. The wheel cover 121a is disposed in a direction opposite to a direction in which the motor 123 is disposed based on the wheel frame. The wheel cover 121a is disposed at the center portion of the wheel outer peripheral portion 121b.

The traveler 120 includes the driving motor module 123 which generates a driving force. The traveler 120 includes the drive motor module 123 which provides the driving force to the driving wheel 121. The driving motor module 123 includes the first driving motor 123(L) which provides the driving force to the first wheel 121(L), and the second driving motor 123(R) which provides the driving force to the second wheel 121(R). The first driving motor 123(L) and the second driving motor 123(R) may be disposed spaced apart from side to side. The first driving motor 123(L) may be disposed on a left side of the second driving motor 123(R).

The first driving motor 123(L) and the second driving motor 123(R) may be disposed on the lower portion of the body 110. The first driving motor 123(L) and the second driving motor 123(R) may be disposed at the rear portion of the body 110.

The first driving motor 123(L) may be disposed on a right side of the first wheel 121(L), and the second driving motor 123(R) may be disposed on a left side of the second wheel 121(R). The first driving motor 123(L) and the second driving motor 123(R) are fixed to the body 110.

The first driving motor 123(L) is disposed inside the first motor housing 119a, and the motor shaft may protrude to the left. The second driving motor 123(R) is disposed inside the second motor housing 119b, and the motor shaft may protrude to the right.

In the present embodiment, the first wheel 121(L) and the second wheel 121(R) are directly connected to a rotating shaft of the first driving motor 123(L) and a rotating shaft of the second driving motor 123(R), respectively. However, a component such as a shaft may be connected to the first wheel 121(L) and the second wheel 121(R), a rotational force of the motors 123(L) and 123(R) may be transmitted to the wheels 121a and 120b via a gear or chain.

The traveler 120 may include the auxiliary wheel 125 which supports the body 110 together with the driving wheel 121. The auxiliary wheel 125 may be disposed in front of the blade 131. The auxiliary wheel 125 is a wheel which does not receive the driving force by the motor, and serves to assist the body 110 with respect to the ground. A caster supporting a rotating shaft of the auxiliary wheel 125 is coupled to the frame 111 to be rotatable about a vertical axis. The first auxiliary wheel 125(L) disposed on the left side and the second auxiliary wheel 125(R) disposed on the right side may be provided.

The operator 130 is provided to perform a predetermined work. The operator 130 is disposed on the body 110.

For example, the operator 130 may be provided to perform works such as cleaning or lawn mowing. As another example, the operator 130 may be provided to perform a work such as transporting an object or finding an object. As still another example, the operator 130 may perform a security function for detecting an external intruder or a dangerous situation.

In the present embodiment, the operator 130 is described as performing mowing. However, a type of a work to be performed by the operator 130 may be various, and need not be limited to the example of the description.

The operator 130 may include the blade 131 rotatably provided to mow the lawn. The operator 130 may include a blade motor 132 which provides a rotational force to the blade 131.

The blade 131 is disposed between the driving wheel 121 and the auxiliary wheel 125. The blade 131 is disposed on the lower portion of the body 110. The blade 131 is provided to be exposed from the lower side of the body 110. The blade 131 rotates around a rotation axis extending in an up-down direction to mow the lawn.

The blade motor 132 may be disposed in front of the first wheel 121(L) and the second wheel 121(R). The blade motor 132 is disposed in a lower portion of a central portion in an inner space of the body 110.

The blade motor 132 may be disposed behind the auxiliary wheel 125. The blade motor 132 may be disposed in the lower portion of the body 110. The rotational force of the motor shaft is transmitted to the blade 131 using a structure such as a gear.

The moving robot 100 includes a battery (not illustrated) which supplies power to the driving motor module 123. The battery provides power to the first driving motor 123(L). The battery provides power to the second driving motor 123(R). The battery may supply power to the blade motor 132. The battery may provide power to a controller 190, an azimuth sensor 176, and an output unit 165. The battery may be disposed on a lower side of a rear portion in the inner space of the body 110.

The moving robot 100 is provided to change a height of the blade 131 with respect to the ground, and thus, can change a mowing height of the lawn. The moving robot 100 includes the height adjuster 156 for the user to change the height of the blade 131. The height adjuster 156 may include a rotatable dial, and the dial is rotated to change the height of the blade 131.

The moving robot 100 includes the height display 157 which displays a level of the height of the blade 131. When the height of the blade 131 is changed according to an operation of the height adjuster 156, the height level displayed by the height display 157 is also changed. For example, the height display 157 may display a predicted height value of the lawn after the moving robot 100 performs lawn mowing with a current height of the blade 131.

The moving robot 100 includes a docking insertion 158 which is connected to a docking device 200 when the moving robot 100 docks with the docking device 200. The docking insertion 158 is provided to be recessed to be inserted into the docking connector 210 of the docking device 200. The docking insertion 158 is disposed on the front surface portion of the body 110. The moving robot 100 can be correctly guided when being charged by the connection of the docking insertion 158 and the docking connector 210.

The moving robot 100 may include a charging corresponding terminal 159 disposed at a position contactable with a charging terminal 211 to be described later in a state where the docking insertion 158 is inserted into the docking connector 210. The charging corresponding terminal 159 may include a pair of charging corresponding terminals 159a and 159b disposed at positions corresponding to the pair of charging terminals 211 (211a and 211b). The pair of charging correspondence terminals 159a and 159b may be disposed left and right in a state where the docking insertion portion 158 is interposed therebetween.

A terminal cover (not illustrated) may be provided to cover the docking insertion 158 and the pair of charging terminals 211 (211a, 211b) so as to be opened and closed. When the moving robot 100 travels, the terminal cover may cover the docking insertion 158 and the pair of charging terminals 211 (211a and 211b). When the moving robot 100 is connected to the docking device 200, the terminal cover is opened, and the docking insertion 158 and the pair of charging terminals 211 (211a and 211b) may be exposed.

Figure 5:
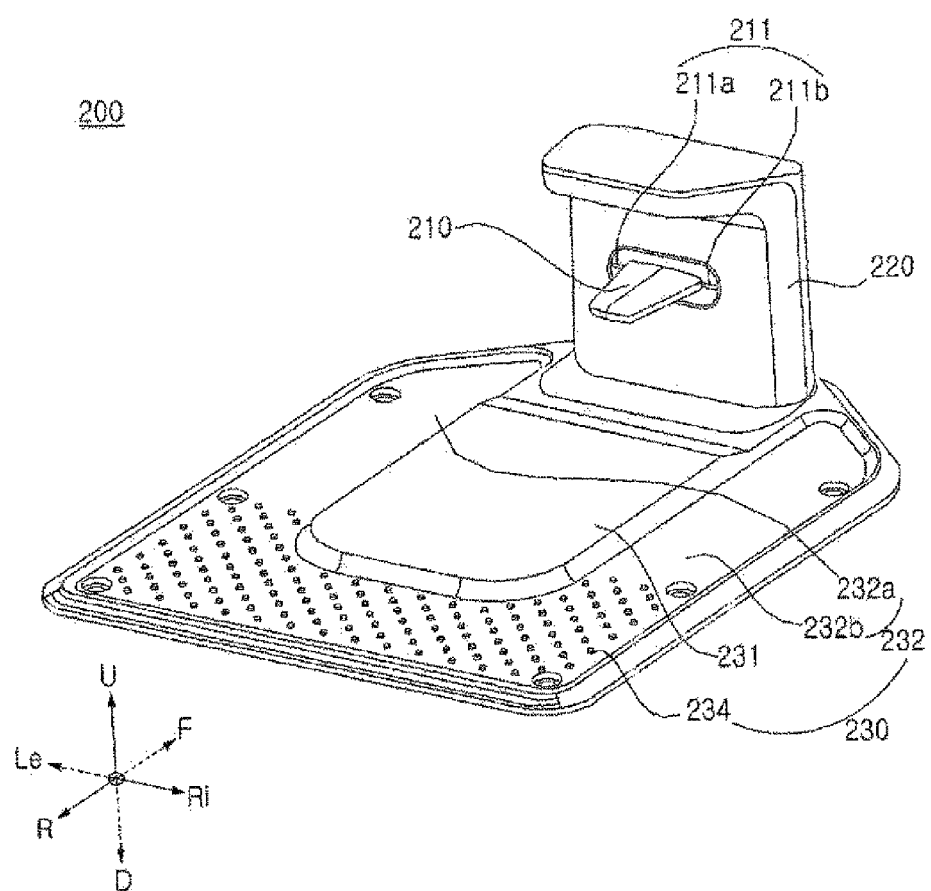
FIG. 5 is a perspective view illustrating a docking device 200 which docks the moving robot 100 of FIG. 1.
Figure 6:
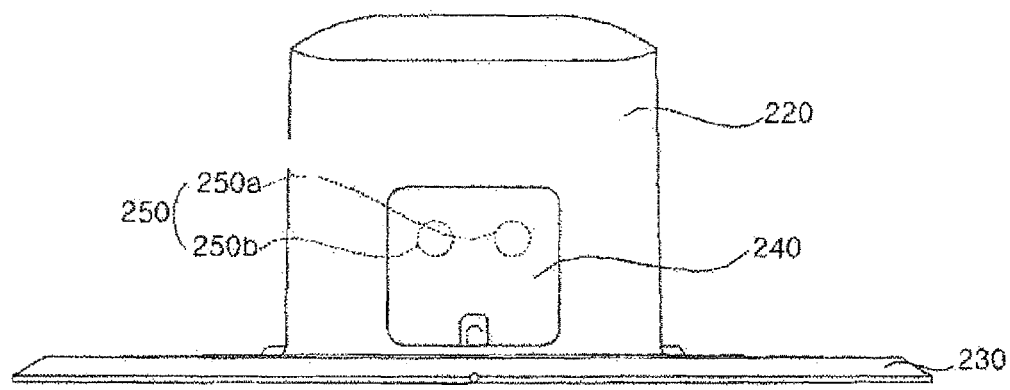
FIG. 6 is an elevational view when the docking device 200 of FIG. 5 is viewed from the front.
Figure 6:
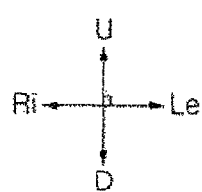

Meanwhile, referring to FIGS. 5 and 6, the docking device 200 includes a docking base 230 disposed on the floor and a docking support 220 protruding upwardly from a front portion of the docking base 230.

The docking base 230 defines a surface parallel in a horizontal direction. The docking base 230 has a plate shape so that the moving robot 100 can be seated. The docking support 220 extends from the docking base 230 in a direction intersecting the horizontal direction.

The moving robot 100 includes the docking connector 210 which is inserted into the docking insertion 158 when the moving robot 100 is charged. The docking connector 210 protrude rearward from the docking support 220.

The docking connector 210 may have a thickness in the up-down direction smaller than a width in the right-left direction. The width of the docking connector 210 in the right-left direction may narrowed rearward. When viewed from above, a shape of the docking connection 210 is trapezoidal in whole. The docking connector 210 is formed in a right and left symmetrical shape. A rear portion of the docking connector 210 forms a free end, and a front portion of the docking connector 210 is fixed to the docking support 220. The rear portion of the docking connector 210 may be formed in a rounded shape.

When the docking connector 210 is completely inserted into the docking insertion 158, the moving robot 100 may be charged by the docking device 200.

The docking device 200 includes the charging terminal 211 for charging the moving robot 100. The charging terminal 211 and the charging corresponding terminal 159 of the moving robot 100 come into contact with each other, and thus, power for charging may be supplied from the docking device 200 to the moving robot 100.

The charging terminal 211 includes a contact surface facing the rear side, and the charging corresponding terminal 159 includes a contact corresponding surface facing the front side. The contact surface of the charging terminal 211 and the contact corresponding surface of the charging corresponding terminal 159 come into contact with each other, and thus, the power of the docking device 200 is connected to the moving robot 100.

The charging terminal 211 may include the pair of charging terminals 211 (211a and 211b) forming positive and negative poles. The first charging terminal 211 (211a) is provided to come into contact with the first charging terminal 159a, and the second charging terminal 211 (211b) is provided to come into contact with the second charging terminal 159b.

The pair of charging terminals 211 (211a and 211b) may be disposed in a state where the docking connector 210 is interposed therebetween. The pair of charging terminals 211 (211a and 211b) may be disposed on right and left of the docking connector 210.

The docking base 230 includes a wheel guard 232 on which the driving wheel 121 and the auxiliary wheel 125 of the moving robot 100 ride. The wheel guard 232 includes a first wheel guard 232a which guides a movement of the first auxiliary wheel 125 and a second wheel guard 232b which guides a movement of the second auxiliary wheel 125. An upper convex center base 231 is disposed between the first wheel guard 232a and the second wheel guard 232b. The docking base 230 includes a slip prevention 234 for preventing slipping of the first wheel 121(L) and the second wheel 121(R). The slip prevention 234 may include a plurality of protrusions protruding upward.

Meanwhile, a boundary wire 290 for setting a boundary of a traveling area of the moving robot 100 may be implemented. The boundary wire 290 may generate a predetermined boundary signal. The moving robot 100 may detect a boundary signal and recognize a boundary of the traveling area set by the boundary wire 290.

For example, a predetermined current flows along the boundary wire 290 to generate a magnetic field around the boundary wire 290. Here, the generated magnetic field is a boundary signal. An AC current having a predetermined change pattern may flow through the boundary wire 290 so that the magnetic field generated around the boundary wire 290 may be changed to have a predetermined change pattern. The moving robot 100 can recognize that the moving robot 100 approaches the boundary wire 290 within a predetermined distance using a boundary signal detector 177 which detects the magnetic field, and thus, the moving robot 100 can travel only the traveling area within the boundary set by the boundary wire 290.

The boundary wire 290 may generate a magnetic field in a direction different from a reference wire 270. For example, the boundary wire 290 may be disposed substantially parallel to the horizontal plane. Here, the "substantially parallel" can include parallelism in an engineering sense, including complete parallelism in a mathematical sense and a certain level of error.

The docking device 200 may serve to transmit a predetermined current to the boundary wire 290. The docking device 200 may include a wire terminal 250 connected to the boundary wire 290. Both ends of the boundary wire 290 may be connected to a first wire terminal 250a and a second wire terminal 250b, respectively. When the boundary wire 290 and the wire terminal 250 are connected to each other, the power of the docking device 200 can supply a current to the boundary wire 290.

The boundary wire 290 may include a plurality of wires defining boundaries of a plurality of traveling areas. That is, the entire area may be divided into two areas for a random homing traveling path.

The wire terminal 250 may be disposed at a front portion F of the docking device 200. That is, the wire terminal 250 may be disposed on a side opposite to a direction in which the docking connector 210 protrudes. The wire terminal 250 may be disposed on the docking support 220. The first wire terminal 250a and the second wire terminal 250b may be disposed spaced apart from side to side.

The docking device 200 may include a wire terminal opening/closing portion 240 which covers the wire terminal 250 so that the wire terminal 250 can be opened or closed. The wire terminal opening/closing portion 240 may be disposed at the front portion F of the docking support 220. The wire terminal opening/closing portion 240 is hinged to the docking support 220 and may be preset to perform an opening/closing operation when the wire terminal opening/closing portion 240 is rotated.

Meanwhile, the reference wire 270 for recognizing the position of the docking device 200 to the moving robot 100 may be implemented. The reference wire 270 may generate a predetermined docking position signal. The moving robot 100 detects the docking position signal, recognizes the position of the docking device 200 by the reference wire 270, and may return to the recognized position of the docking device 200 when a return command or charging is required. The position of the docking device 200 may be a reference point of the traveling of the moving robot 100.

The reference wire 270 is formed of a conductive material through which electricity can flow.

The reference wire 270 may be connected to the power supply of the docking device 200 to be described later.

For example, a magnetic field may be generated around the reference wire 270 by causing a predetermined current to flow along the reference wire 270. Here, the generated magnetic field is the docking position signal. By allowing an alternating current having a predetermined change pattern to flow through the reference wire 270, a magnetic field generated around the reference wire 270 may change with a predetermined change pattern. The moving robot 100 can recognize that the moving robot 100 is close to the reference wire 270 within a predetermined distance by using the boundary signal detector 177 which detects the magnetic field, and accordingly, the moving robot 100 can return to the position of the docking device 200 set by the reference wire 270.

The reference wire 270 may generate the magnetic field in a direction distinct from the boundary wire 290. For example, the reference wire 270 may extend in a direction intersecting the horizontal direction. Preferably, the reference wire 270 may extend in the up-down direction orthogonal to the horizontal direction.

The reference wire 270 may be installed on the docking device 200. The reference wire 270 may be disposed at various positions in the docking device 200.

Figure 7:
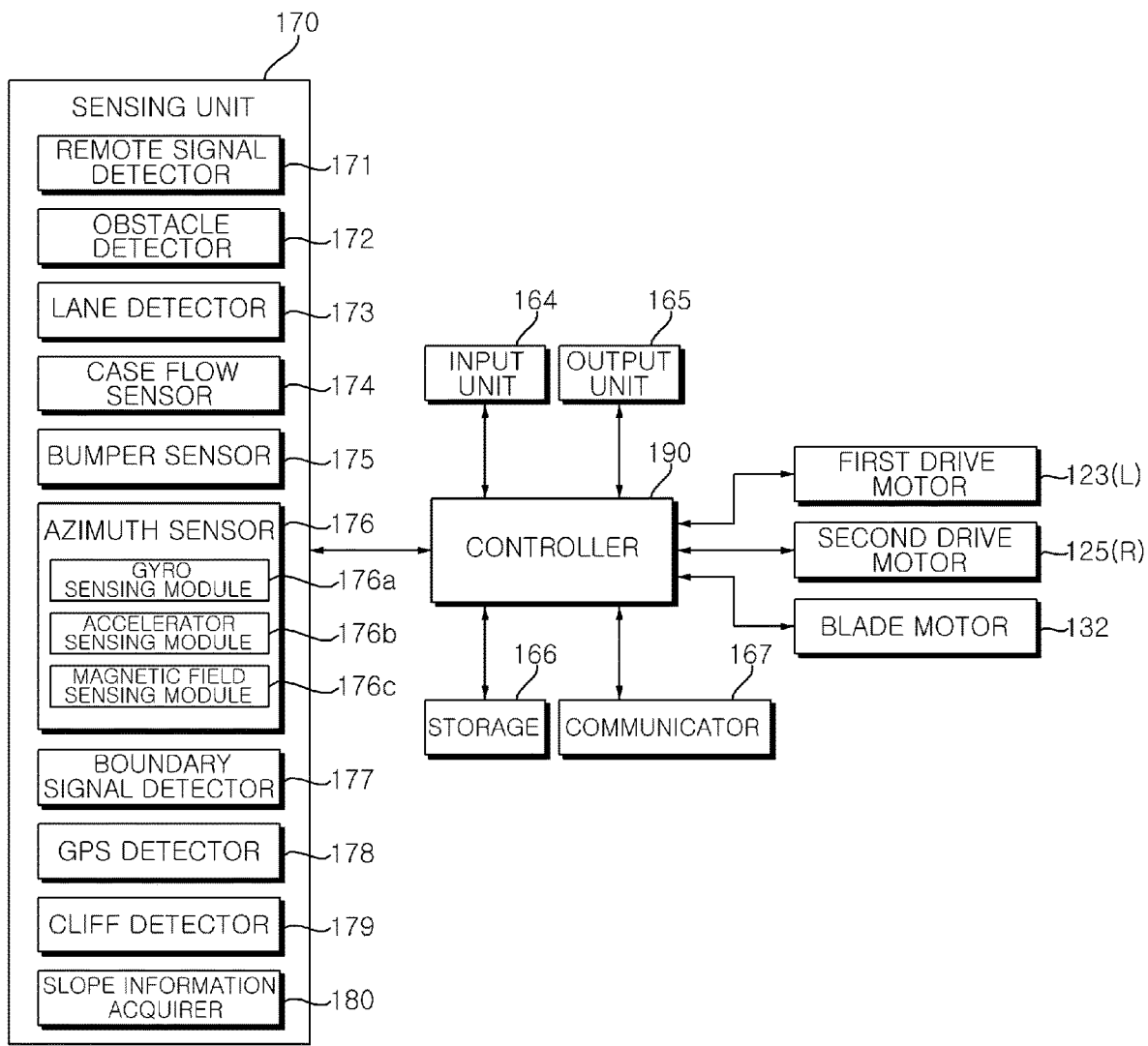
FIG. 7 is a block diagram illustrating a control relationship of the moving robot 100 of FIG. 1.

FIG. 7 is a block diagram illustrating a control relationship of the moving robot 100 of FIG. 1.

Meanwhile, referring to FIG. 7, the moving robot 100 may include the input unit 164 capable of inputting various instructions of the user. The input unit 164 may include a button, a dial, and a touch-type display. The input unit 164 may include a microphone (not illustrated) for speech recognition. In the present embodiment, a plurality of buttons are disposed on an upper portion of the case 112.

The moving robot 100 may include the output unit 165 which outputs various information to the user. The output unit 165 may include a display module which outputs visual information. The output unit 165 may include a speaker (not illustrated) which outputs auditory information.

In the present embodiment, the display module 165 outputs an image upward. The display module 165 is disposed on the upper portion of the case 112. As an example, the display module 165 may include a thin film transistor liquid-crystal display (LCD) panel. In addition, the display module 165 may be implemented using various display panels such as a plasma display panel or an organic light emitting diode display panel.

The moving robot 100 includes a storage 166 for storing various information. The storage 166 records various information necessary for the control of the moving robot 100, and may include a volatile or nonvolatile recording medium. The storage 166 may store information input from the input unit 164 or received by a communicator 167. A program for controlling the moving robot 100 may be stored in the storage 166.

The moving robot 100 may include the communicator 167 for communicating with an external device (terminal or the like), a server, a router, or the like. For example, the communicator 167 may be implemented to wirelessly communicate with wireless communication technologies such as IEEE 802.11 WLAN, IEEE 802.15 WPAN, UWB, Wi-Fi, Zigbee, Z-wave, and Blue-Tooth. The communicator may be changed depending on the communication method of another device or a server.

The moving robot 100 includes a sensing unit 170 which senses information related to a state of the moving robot 100 or an environment outside the moving robot 100. The sensing unit 170 may be include at least one of a remote signal detector 171, an obstacle detector 172, a rain detector 173, a case movement sensor 174, a bumper sensor 175, azimuth sensor 176, boundary signal detector 177, a GPS detector 178, and a cliff detector 179.

The remote signal detector 171 receives an external remote signal. When the remote signal is transmitted by an external remote controller, the remote signal detection unit 171 may receive the remote signal. For example, the remote signal may be an infrared signal. The signal received by the remote signal detector 171 may be processed by the controller 190.

A plurality of remote signal detector 171 may be provided. The plurality of remote signal detectors 171 include a first remote signal detection unit 171a disposed on the front portion of the body 110 and a second remote signal detection unit 171b disposed on the rear portion of the body 110. The first remote signal detector 171a receives a remote signal transmitted from the front. The second remote signal detector 171b receives a remote signal transmitted from the rear.

The obstacle detector 172 detects an obstacle around the moving robot 100. The obstacle detector 172 may detect an obstacle in front. A plurality of obstacle detectors 172a, 172b, and 172c may be provided. The obstacle detector 172 is disposed on the front surface of the body 110. The obstacle detector 172 is disposed above the frame 111. The obstacle detector 172 may include an infrared sensor, an ultrasonic sensor, an RF sensor, a geomagnetic sensor, a Position Sensitive Device (PSD) sensor, or the like.

The rain detector 173 detects rain when rain occurs in an environment where the moving robot 100 is placed. The rain detector 173 may be disposed in the case 112.

The case movement sensor 174 detects the movement of the case connector. When the case 112 is raised upward with respect to the frame 111, the case connector moves upward, and the case movement sensor 174 detects that the case 112 is raised. When the case movement sensor 174 detects that the case 112 is raised, the controller 190 may control to stop the operation of the blade 131. For example, when the user raises the case 112 or a situation in which the case 112 is raised by a lower obstacle having a significant size occurs, the case movement sensor 174 may detect this.

The bumper sensor 175 can detect a rotation of the movable fixing portion. For example, a magnet may be disposed on one side of the lower portion of the movable fixing portion, and a sensor which detects a change in the magnetic field of the magnet may be disposed on the frame 111. When the movable fixing portion rotates, the sensor detects the change in the magnetic field of the magnet, and thus, the bumper sensor 175 which detects the rotation of the movable fixing portion can be implemented. When the bumper 112b collides with an external obstacle, the movable fixing portion rotates integrally with the bumper 112b. The bumper sensor 175 may detect the rotation of the movable fixing portion, and thus, detect an impact of the bumper 112b.

The azimuth sensor (AHRS) 176 may have a gyro sensing function. The azimuth sensor 176 may further include an acceleration sensing function. The azimuth sensor 176 may further include a magnetic field sensing function.

The azimuth sensor 176 may include a gyro sensing module 176a which performs gyro sensing. The gyro sensing module 176a may detect the horizontal rotational speed of the body 110. The gyro sensing module 176a may detect a tilting speed with respect to the horizontal surface of the body 110.

The gyro sensing module 176a may include a gyro sensing function for three axes of a spatial coordinate system orthogonal to each other. The information collected by the gyro sensing module 176a may be roll, pitch, and yaw information. The processing module can calculate direction angles of the moving robot 100 by integrating the angular velocities of rolling, pitching, and yaw.

The azimuth sensor 176 may include an acceleration sensing module 176b which performs acceleration sensing. The acceleration sensing module 176b may have an acceleration sensing function for the three axes of the spatial coordinate system orthogonal to each other. A given processing module can calculate the speed by integrating the acceleration, and can calculate a moving distance by integrating the speed.

The azimuth sensor 176 may include a magnetic field sensing module 176c which performs magnetic field sensing. The magnetic field sensing module 176c may have a magnetic field sensing function for three axes of a spatial coordinate system orthogonal to each other. The magnetic field sensing module 176c may detect the magnetic field of the Earth.

Meanwhile, a sensing unit 20 includes a slope information acquirer 180 which acquires slope information on a slope of a traveling surface S.

The slope information acquirer 180 may acquire slope information on the slope of the traveling surface S on which the body 110 is mounted by sensing the slope of the body 110. For example, the slope information acquirer 80 may include a gyro sensing module (not illustrated). The slope information acquirer 180 may include a processing module (not illustrated) for converting a detection signal of the gyro sensing module into slope information. The processing module is a portion of the controller 190 and may be implemented as an algorithm or program. As another example, the slope information acquirer 180 may include the magnetic field sensing module 176c (not illustrated) to obtain the slope information based on sensing information on a magnetic field of the Earth.

A gyro sensing module may acquire information on a rotational angular velocity with respect to a horizontal surface of the body 110. Specifically, the gyro sensing module may detect the rotational angular speed about X and Y axes which are parallel to the horizontal surface and are perpendicular to each other. The rotational angular velocity about the horizontal surface can be calculated by synthesizing the rotational angular velocity (roll) about the X axis and the rotational angular velocity (pitch) about the Y axis through a processing module. The rotational angular velocity can be integrated through the processing module to calculate a slope value.

The gyro sensing module may detect a predetermined reference direction. The slope information acquirer 180 may acquire slope information based on the reference direction.

The boundary signal detector 177 detects the boundary signal of the boundary wire 290 or/and the docking position signal of the reference wire 270.

The boundary signal detector 177 may be disposed in the front portion of the body 110. Accordingly, it is possible to detect the boundary of the traveling area early while moving forward, which is a main traveling direction of the moving robot 100. The boundary signal detector 177 may be disposed in an inner space of the bumper 112b.

The boundary signal detector 177 may include a first boundary signal detector 177a and a second boundary signal detector 177b which are spaced apart from side to side. The first boundary signal detector 177a and the second boundary signal detector 177b may be disposed in the front portion of the body 110.

For example, the boundary signal detector 177 includes a magnetic field sensor. The boundary signal detector 177 may be implemented using a coil to detect a change in a magnetic field. The boundary signal detector 177 may detect a magnetic field in at least a horizontal direction. The boundary signal detector 177 may detect a magnetic field with respect to three axes which are orthogonal to each other in space.

Specifically, the first boundary signal detector 177a may detect a magnetic field signal in a direction orthogonal to the second boundary signal detector 177b. The first boundary signal detector 177a and the second boundary signal detector 177b may detect magnetic field signals in directions orthogonal to each other, and combine the detected magnetic field signal values to detect the magnetic field with respect to the three axes orthogonal to each other in the space.

When the boundary signal detector 177 detects the magnetic field with respect to the three axes which are orthogonal to each other in space, the direction of the magnetic field is determined by a sum vector value of the three axes, and if the direction of the magnetic field is close to the horizontal direction, the docking position signal can be recognized, and if the direction of the magnetic field is close to the vertical direction, the boundary signal can be recognized.

Further, when a plurality of divided traveling areas are present, the boundary signal detector 177 may distinguish between an adjacent boundary signal and boundary signals of the plurality of traveling areas by a difference in intensities of magnetic fields, and distinguish between the adjacent boundary signal and the docking position signal by a difference in directions of the magnetic fields.

As another example, when the plurality of divided traveling areas are present, the boundary signal detector 177 may distinguish between the adjacent boundary signal and the boundary signals of the plurality of traveling areas by a difference in a magnetic field distribution. Specifically, the boundary signal detector 177 may detect that the intensity of the magnetic field has a plurality of peaks within a preset distance on plane coordinates and recognize the signal as the adjacent boundary signal.

The GPS detector 178 may be provided to detect a Global Positioning System (GPS) signal. The GPS detector 178 may be implemented using a PCB.

The cliff detection unit 179 detects the presence of a cliff on the traveling surface.

The cliff detection unit 179 is disposed in the front portion of the body 110 and can detect the presence or absence of a cliff in front of the moving robot 100.

The sensing unit 170 may include an opening/closing detector (not illustrated) which detects whether at least one of the first opening/closing unit 117 and the second opening/closing unit 118 is opened or closed. The opening/closing detector may be disposed in the case 112.

The moving robot 100 includes the controller 190 which controls autonomous traveling. The controller 190 may process a signal of the sensing unit 170. The controller 190 can process a signal of the input unit 164.

The controller 190 may control the driving of the first driving motor 123(L) and the second driving motor 123(R). The controller 190 may control the driving of the blade motor 132. The controller 190 can control the output of the output unit 165.

The controller 190 includes a main board (not illustrated) disposed in the inner space of the body 110. The main board means a PCB.

The controller 190 may control the autonomous driving of the moving robot 100. The controller 190 may control the driving of the traveler 120 based on the signal received from the input unit 164. The controller 190 may control the driving of the traveler 120 based on the signal received from the sensing unit 170.

In addition, the controller 190 may process the signal of the boundary signal detector 177. Specifically, the controller 190 may determine a current position by analyzing the boundary signal through the boundary signal detector 177 and control the driving of the traveler 120 according to a traveling pattern.

In this case, the controller 190 may control the traveler 120 according to the traveling pattern in a zigzag mode.

Hereinafter, the traveling in the zigzag mode under control of the controller 190 will be described with reference to FIG. 8.

Figure 8:
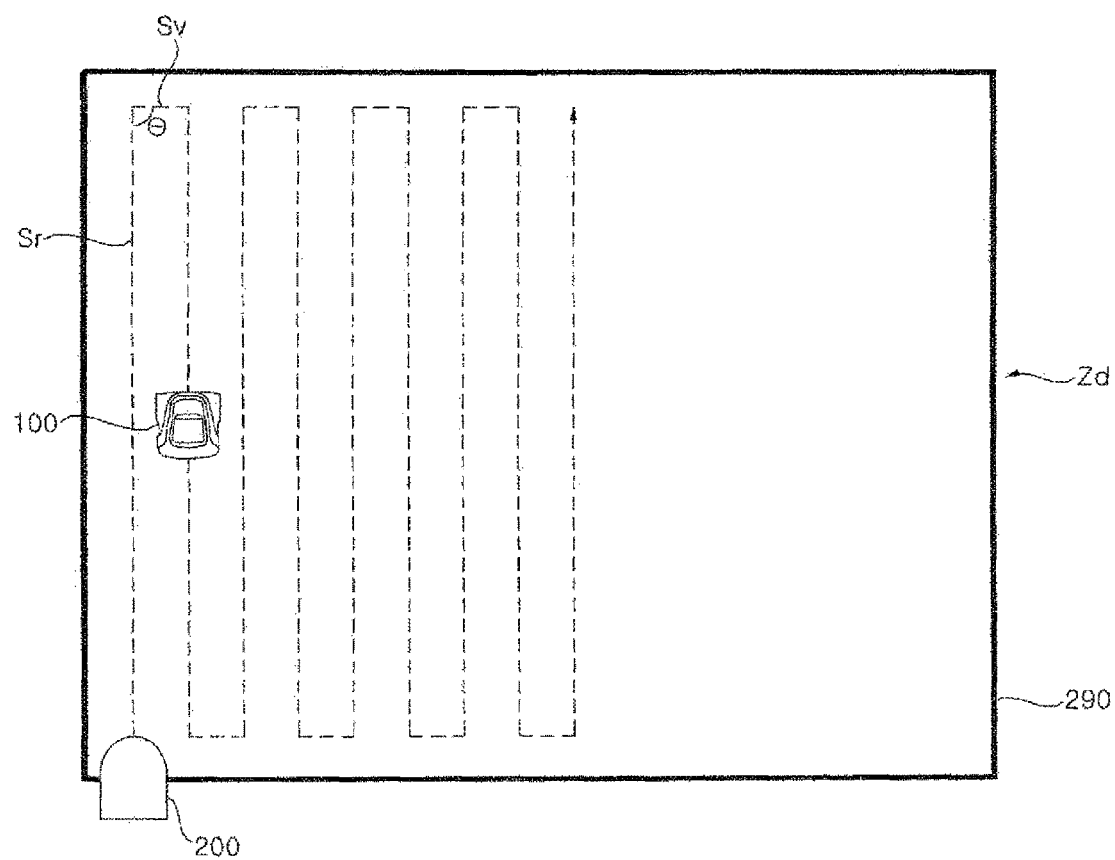
FIG. 8 is a view illustrating a moving robot system according to an embodiment of the present disclosure.
Figure 8:
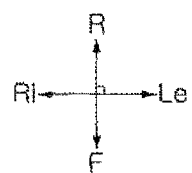

FIG. 8 is a diagram illustrating a moving robot 100 system according to an embodiment of the present disclosure.

Referring to FIG. 8, the moving robot 100 system of the present disclosure may include a boundary wire 290 defining one traveling area, and the moving robot 100 traveling inside the traveling area. In addition, the moving robot 100 system of the present disclosure may further include a docking device 200 to which the moving robot 100 is docked and charged.

In this case, in FIG. 8, one traveling area is illustrated as an example, but the present disclosure is not limited thereto, and a plurality of traveling areas may be formed.

The controller 190 may perform a pattern traveling mode in which the moving robot travels one traveling area in a predetermined pattern. A predetermined pattern traveling mode for moving the body 110 along predetermined pattern path Sr and Sv is preset. The pattern traveling mode includes at least a predetermined algorithm for driving the traveler 120. The pattern traveling mode may include an algorithm for driving the traveler 120 according to the detection signal from the sensing unit 170.

Specifically, in FIG. 8, the moving robot 100 may travel in a zigzag mode with a position, at which the docking device 200 is disposed within the traveling area, as a starting point. That is, the moving robot 100 travels along a major axis Sr backward R from the starting point. In this case, when the boundary signal from the boundary wire 290 is received and an edge area is determined, the moving robot 100 rotates in a direction in which a residual area exits, that is, rotates right in FIG. 9, and travels along the minor axis Sv.

In this case, a rotation angle may be an angle of 120° to 60°, and preferably, may satisfy approximately 90°. In addition, it is possible to rotate to have a predetermined curvature when rotating to the right.

Next, when the traveling along the minor axis Sv ends, the moving robot rotates right according to the signal from the boundary wire 290 again and travels along the major axis Sr.

In this case, the traveling along the major axis Sr is to move forward F, and in this way, the moving robot travels in the zigzag mode within one traveling area alternately between the major axis Sr and the minor axis Sv and mows the lawn. Therefore, a plurality of major axes Sr and a plurality of minor axes Sv for traveling within one traveling area may be designed as a target pattern, and the plurality of major axes Sr may be parallel to each other.

In this case, when the moving robot reaches the edge area while mowing the lawn in the traveling area in the zigzag mode, in a case where it is determined that there is no more area to travel right along the traveling direction according to the boundary signal from the boundary wire 290, the moving robot performs traveling toward the docking device 200 according to a homing mode.

In this case, when the moving robot travels toward the docking device, the moving robot may travel a traveling path Sh in a zigzag mode with a predetermined angle, or may travel the traveling path in a linear mode.

In this way, the lengths of the major axis Sr and minor axis Sv are set when one traveling area is formed, the moving robot travels in a zigzag mode along the set major axis Sr and minor axis Sv. The lawn mower robot which is the moving robot 100 moves according to the pattern traveling mode while rotating the blade 131, and thereby, can uniformly mow the lawn in the traveling area.

Meanwhile, the controller 190 may receive the detection signals from various sensors of the sensing unit 170 to obtain environment information in a traveling area Zd.

The controller 190 may reset parameters indicating various functions according to the obtained environment information, and may typically set the bumper sensitivity by reading a detection signal received through the bumper sensor 175.

That is, by resetting the bumper sensitivity for a detection signal generated by sensing a degree of collision of the bumper with an external obstacle from the bumper sensor 175, a criterion for determining whether a current detection signal is due to an obstacle is reset.

As an example, the controller 190 may reset a bumper sensitivity according to environment information on length and density of the lawn, and determine that the lawn is an obstacle or is not an obstacle by a detection signal provided by the bumper sensor 175.

Preferably, when the length of the lawn is long or the lawn density is high, by setting the bumper sensitivity high, the sensitivity may be reduced so that the lawn is not recognized as an obstacle when the bumper sensitivity is equal to or less than the reference value. Accordingly, a long lawn or the like is recognized as an obstacle, and thus, the lawn mowing operation is not stopped and the lawn mowing may be continuously performed.

In addition, when the length of the lawn is short and the density thereof is low, by setting the bumper sensitivity low, it is recognized as the lawn only when the bumper sensitivity is equal to or less than the reference value and it is recognized as the obstacle when the bumper sensitivity is equal to or more than the reference value, and thus, the sensitivity can be strengthened.

By setting the bumper sensitivity according to the condition of the lawn in this way, lawn mowing can be performed in an optimal mode.

In addition, the controller 190 may acquire the slope information on the slope of the traveling surface S from the slope information acquirer 180 and read the slope information to perform slope compensation.

Figure 9:
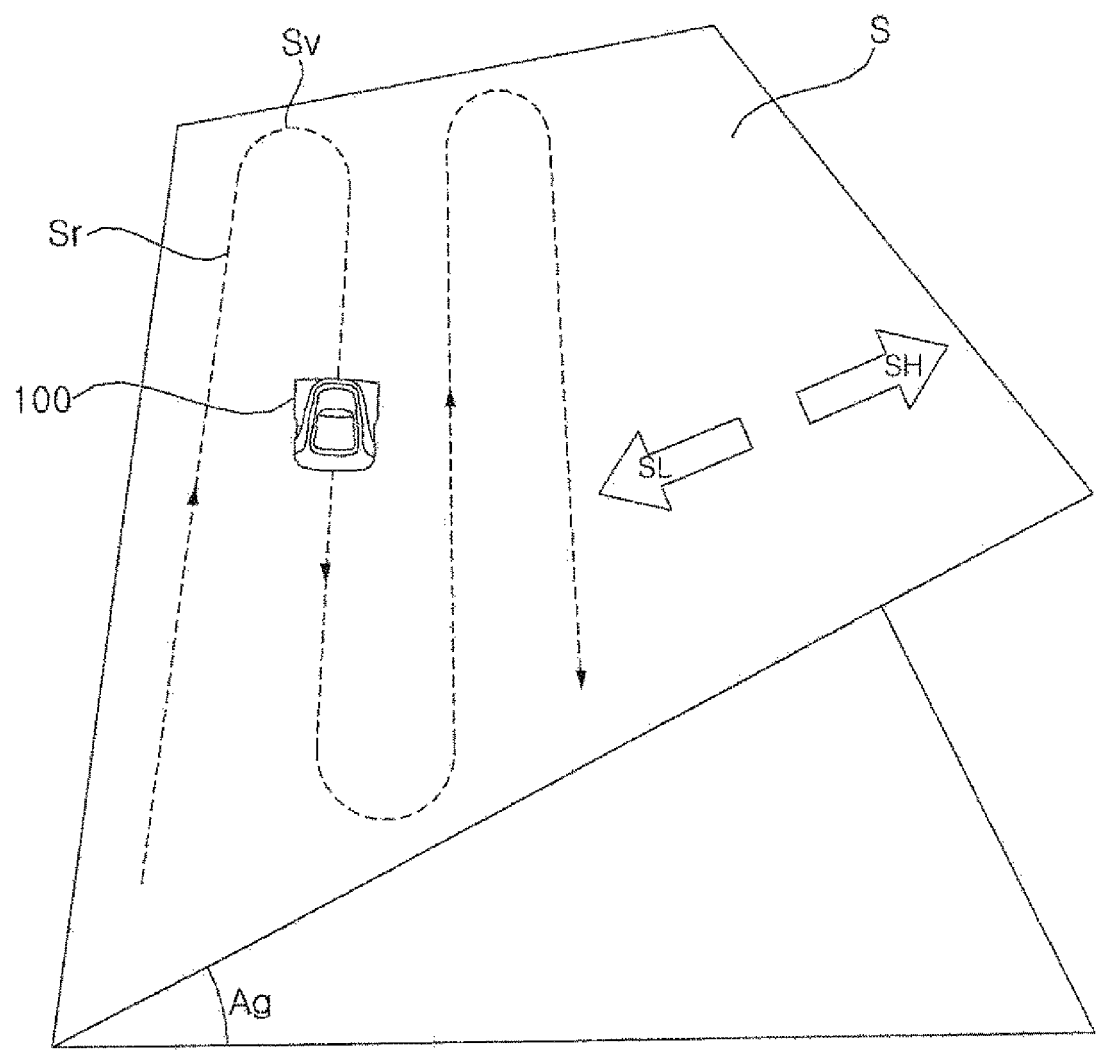
FIG. 9 is a view illustrating a sloped surface according to an embodiment of the present disclosure.

Hereinafter, the slope compensation of the controller 190 will be described with reference to FIG. 9.

The slope information received from the slope information acquirer 180 may include information on a slope value Ag. The slope value Ag may be preset as a value related to a degree of slope of the traveling surface S with respect to a virtual horizontal plane.

The slope information may include information on a slope direction. In the present description, the slope direction may mean a direction corresponding to an upward slope direction of the traveling surface S.

The moving robot 100 may perform the slope compensation according to the received slope information. The controller 190 may determine whether or not to perform slope compensation according to a current slope setting, based on the obtained slope information.

For example, the controller 190 may preset a slope compensation algorithm for performing the slope compensation. The slope compensation algorithm may be preset to determine whether a predetermined slope mode condition is satisfied based on the slope information.

For example, whether or not the slope mode condition is satisfied may be predetermined to be determined by comparing the slope value Ag corresponding to the obtained slope information with a threshold value.

For example, the slope compensation may be performed in a positive direction when the slope value Ag corresponding to the slope information obtained at the current position exceeds the threshold value, and the slope compensation may be performed in a negative direction when the slope value Ag is smaller than the threshold value.

Here, the slope compensation may be preset as a condition in which the slope value Ag is greater than the threshold value or may be preset as a condition in which the slope value Ag is equal to or greater than a threshold value. In any case, the condition is satisfied in which the slope compensation is performed in the positive direction when the slope value Ag exceeds the threshold value and the slope compensation is performed in the negative direction when the slope value is smaller than the threshold value.

For another example, the condition of the slope compensation may be preset to be satisfied when the slope value Ag corresponding to the slope information exceeds a threshold value for a predetermined time or more during movement of the body 110. Here, the condition of the slope compensation may be preset as a condition in which the slope value Ag is greater than the threshold value for the predetermined time or more, or may be preset as a condition in which the slope value Ag is equal to or more than the threshold value for a predetermined time or more. In any case, the condition of the slope compensation is satisfied when the slope value Ag exceeds the threshold value for the predetermined time or more. Accordingly, when the slope value increases for a relatively short period due to vibration or local bending of the ground while the moving robot 100 is moving, a probability of unnecessarily starting slope compensation is reduced by maintaining the inactivity of the slope compensation mode.

When it is determined whether the slope compensation is performed, the controller 190 may perform the slope compensation according to the slope compensation algorithm.

The controller 190 is based on the obtained slope information, and the slope information may include information on a slope direction. The slope direction means a downward slope direction SL of the slope.

When the traveling surface S has a slope of a predetermined reference or more, the controller 190 performs a predetermined compensation control (straight movement compensation, rotation movement compensation) so as to match a target paths Sr and Sv and an actual path as much as possible. When the moving robot 100 moves on a horizontal traveling surface S, the controller 190 does not perform the compensation control, and the target path and the actual path coincide with each other. However, if the controller 190 does not perform the compensation control when the moving robot travels the traveling surface S inclined above a predetermined reference, a phenomenon that the moving robot 100 slides in the downward slope direction SL occurs cannot be canceled out, and thus, there is a significant between the target paths Sr and Sv and the actual path. When the traveling surface (S) has the slope of the predetermined reference or more, the slope mode condition is satisfied and the slope compensation is performed.

When the traveling surface S has the slope of the predetermined reference or more, the controller 190 may perform a predetermined linear movement compensation control to match the target major axis path Sr and the actual major axis path as much as possible, and may perform a predetermined rotational movement compensation control to match the target minor axis path Sv and the actual minor axis path as much as possible.

Meanwhile, the moving robot 100 may acquire predetermined navigation information NI. The navigation information NI means information on an error between a target path and an actual path. For example, when the moving robot 100 returns to the docking device 200 after the traveling is finished, if there is no such error, a sum of displacements recognized by the moving robot 100 should theoretically be zero. However, if there is a difference, the difference can be recognized as the error. Since the navigation information NI on the error is input to the controller 190, the controller 190 can learn by itself. For example, a coefficient value for determining the degree of compensation of the controller 190 may be preset to be changeable based on the input navigation information NI.

The pattern paths Sr and Sv of the controller 190 are preset regardless of the slope of the traveling surface S. That is, the pattern paths Sr and Sv refer to an abstract target path preset according to the algorithm of the pattern traveling mode. When the moving robot 100 travels according to the pattern traveling mode on the horizontal traveling surface S, the actual path becomes the pattern paths Sr and Sv. The controller 190 may perform the compensation control based on the pattern paths Sr and Sv.

When the slope value Ag is equal to or more than the threshold value, the controller 190 may prevent the sloped surface S from proceeding in the downward slope direction SL by setting a large slope compensation. In addition, when the slope value Ag is less than the threshold value, the controller 190 may set the traveling so that the moving robot travels along the pattern path having a general target slope value Ag by setting a small slope compensation.

In this way, the controller 190 reads gradient information from the sensing unit 170 and the detection signal from the bumper sensor 175 to obtain environment information of the traveling area. Accordingly, parameters for each control signal are reset, and thus, and optimum sensor setting can be realized according to a corresponding traveling area.

Hereinafter, a method of controlling the moving robot 100 will be described with reference to FIG. 10.

Figure 10:
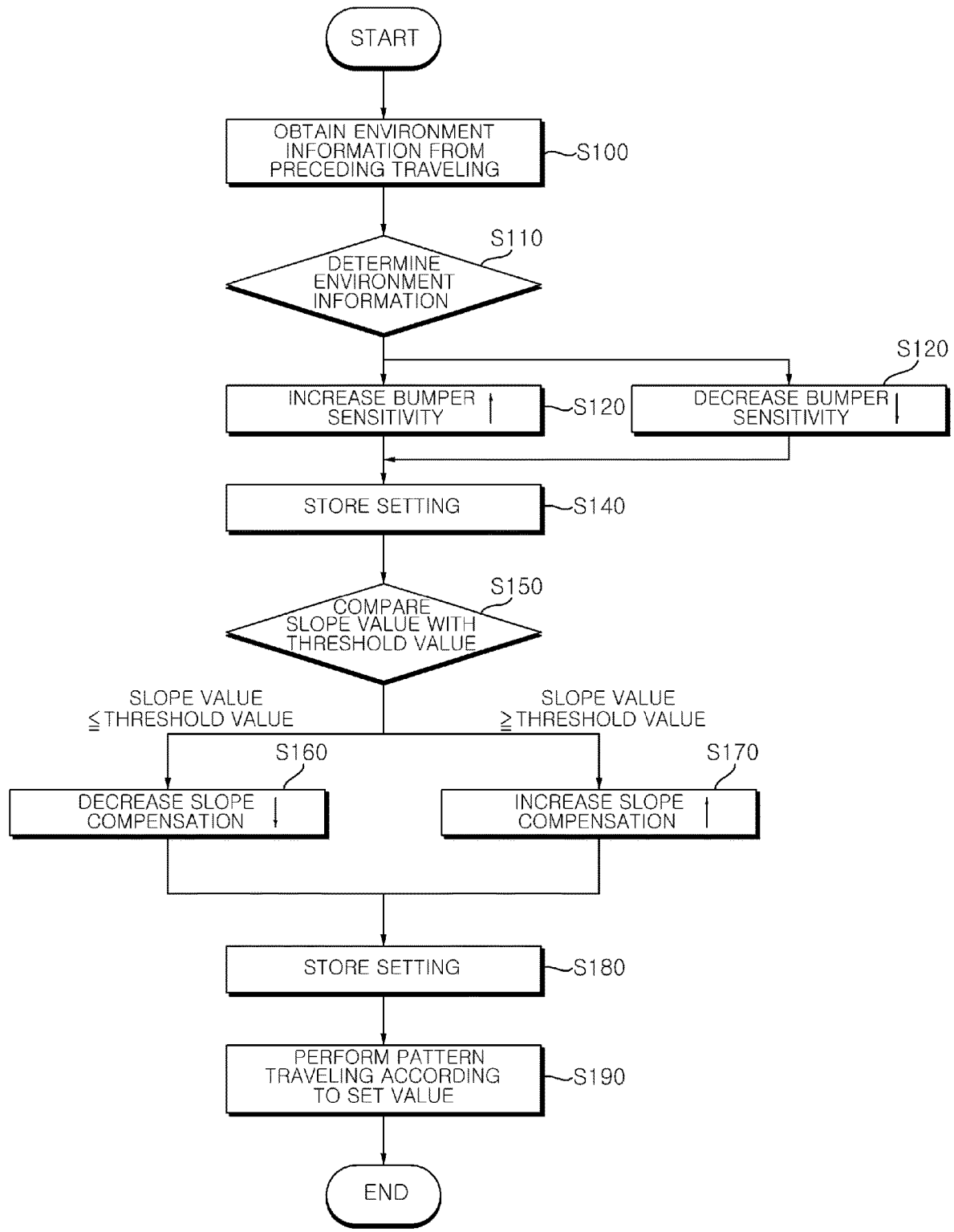
FIG. 10 is a flowchart illustrating a control method of a moving robot according to an embodiment of the present disclosure.

Referring to FIG. 10, first, the controller 190 performs preceding traveling in the traveling area (S100).

The preceding traveling can perform the pattern traveling, and can be performed through wire following. In this case, the moving robot 100 obtains the gradient of the sloped surface of the traveling area and environment information from the sensors of each sensing unit 170.

For example, the controller 190 may obtain information on the length of the lawn and the density of the lawn from the sensing unit 170, and obtain a gradient of a corresponding sloped surface from the slope information acquirer 180.

First, the controller 190 sets the bumper sensitivity based on the obtained environment information.

That is, the controller 190 matches the bumper sensitivity according to the obtained lawn length or lawn density (S110). In this case, when the matched bumper sensitivity is lower than the currently set bumper sensitivity (threshold value), the current bumper sensitivity may be increased to the matched bumper sensitivity (S120).

That is, if there is a risk that the moving robot 100 determines the lawn as an obstacle due to a long length of the lawn or a high density of the lawn, the current bumper sensitivity is increased by the matched bumper sensitivity according to the lawn length and the lawn density.

Accordingly, since the sensitivity criterion is increased with respect to the detection signal of the bumper sensor 175, the controller 190 does not determine the lawn having a long length as an obstacle and continues to mow the lawn.

The controller 190 may set the bumper sensor 175 according to the set bumper sensitivity and determine whether there is an obstacle according to the detection signal provided accordingly.

The controller 190 stores setting information on the set bumper sensitivity (S140).

Meanwhile, the controller 190 performs the slope compensation based on the received gradient information (S150).

Specifically, the received gradient information and the threshold value are compared with each other, and it is determined that the slope is very large when the gradient is greater than the threshold value, and accordingly, a level of slope compensation is increased and the slope compensation is set to be performed largely (S170).

Therefore, the compensation can be performed so that the pattern traveling is performed in the upward slope direction (SH).

If the gradient is equal to or less than the threshold value according to the gradient information, the level of slope compensation may be lowered, and thus, the pattern traveling may be performed along the initially set pattern path (S160). Alternatively, when the gradient is lower than the initially set reference gradient, the slope compensation value may be further lowered so that the pattern path proceeds in the downward slope direction.

Next, the controller 190 may store the set slope compensation value (S180) and generate a new compensated pattern path according to the slope compensation value.

The slope compensation value and the compensated pattern path are stored, and thus, the pattern traveling of the moving robot 100 is performed (S190).

In this way, the moving robot 100 obtains the environment information through preceding traveling. Accordingly, the moving robot 100 performs slope compensation and bumper sensitivity setting by itself, and thus, can provide an optimized pattern traveling within the current traveling area.

Hereinafter, a method of controlling the moving robot 100 according to another embodiment of the present disclosure according to FIGS. 11 to 14 will be described.

Figure 11:
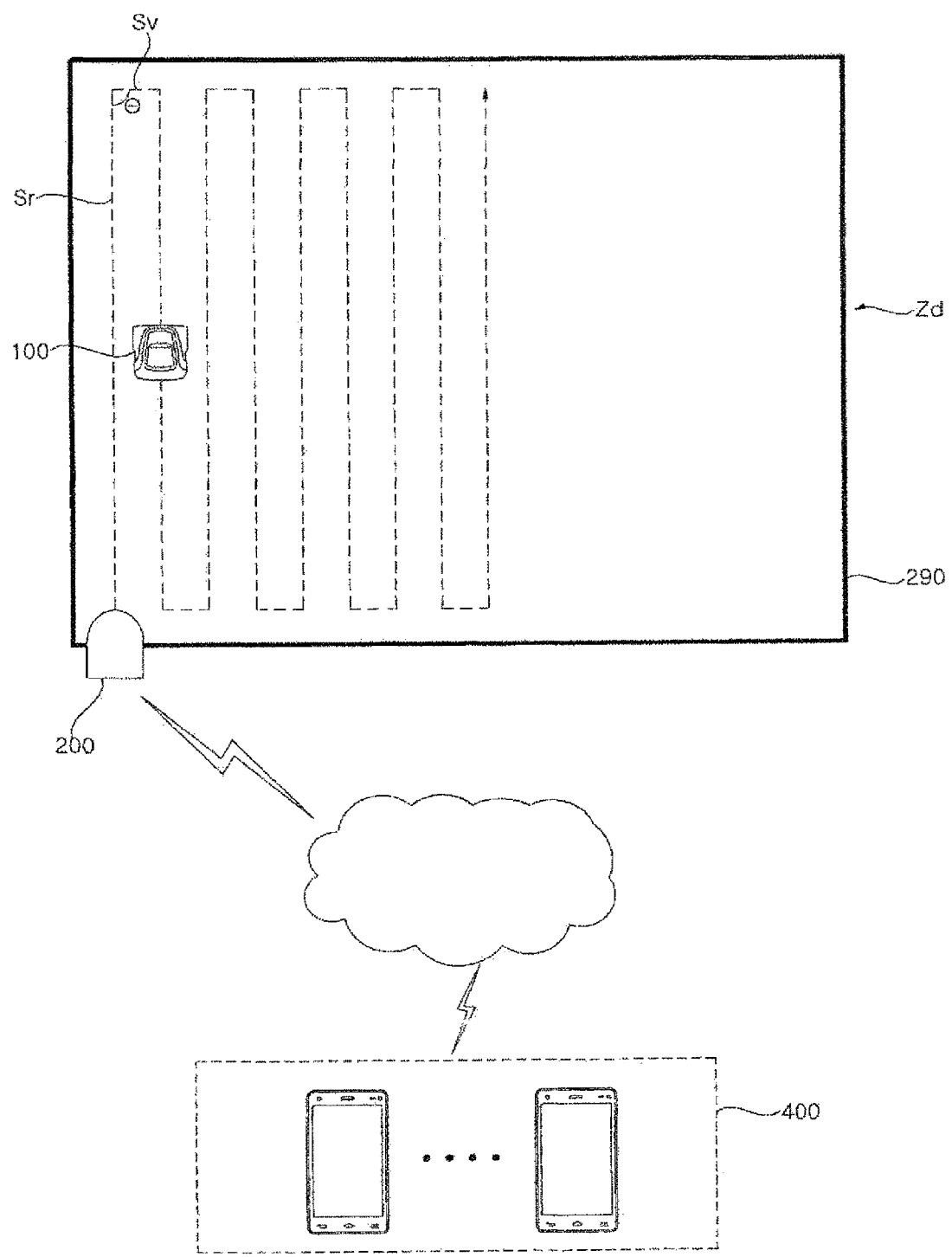
FIG. 11 is a view illustrating a moving robot system according to another embodiment of the present disclosure.
Figure 12:
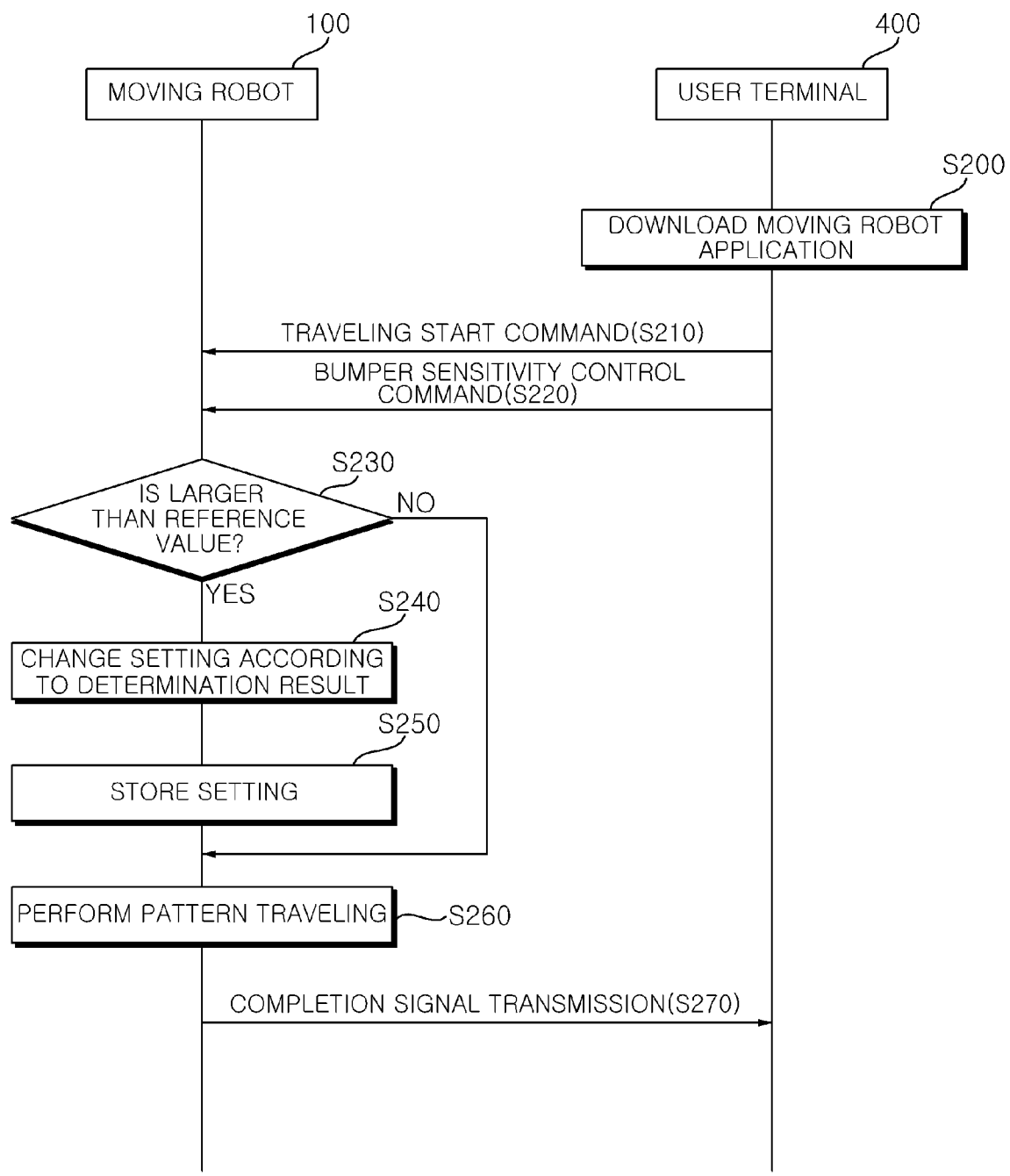
FIG. 12 is a flowchart illustrating a control method of a bumper sensitivity of a moving robot according to another embodiment of the present disclosure.

FIG. 11 is a view illustrating the moving robot 100 system according to another embodiment of the present disclosure, and FIG. 12 is a flowchart illustrating a control method of a bumper sensitivity of the moving robot 100 according to another embodiment of the present disclosure.

The moving robot 100 system according to another embodiment of the present disclosure includes the user terminal 400 which perform transmission/reception with respect to the moving robot 100 as illustrated in FIG. 11.

The user terminal 400 may be various types of mobile communication terminals 400 capable of transmitting and receiving information to and from the moving robot 100 through a communication system and transmitting control signals to the moving robot 100.

For example, the user terminal 400 is a mobile communication terminal 400 including a display device having a predetermined size, and may be a device such as a smartphone, a mobile phone, a tab, a notebook, and a desktop.

This user terminal 400 directly transmits a control signal for the operation of the moving robot 100, specifically a lawn mowing work, to the moving robot 100, and the moving robot 100 may determine the corresponding traveling angle according to the control signal and performs the traveling.

In addition, the user terminal 400 may download and execute a moving robot 100 control application capable of receiving work information on the moving robot 100 and receiving an alarm for the work information.

The user terminal 400 may receive and check information and notifications transmitted from the moving robot 100 by executing the moving robot 100 control application, and transmit the control signal through the application.

In addition, the user terminal 400 may receive information on the moving robot 100 through SMS or a mobile messenger, and may transmit the control signal for the moving robot 100 through the mobile messenger.

Hereinafter, it is assumed that the moving robot 100 control application is downloaded and installed in the user terminal 400.

First, if the user terminal 400 downloads and installs the moving robot 100 control application (S200), the user can register the moving robot 100 in the application.

The communicator of the moving robot 100 receives a traveling start command signal for lawn mowing through the application from the user terminal 400 (S210).

The user terminal 400 may transmit the traveling start command signal through a traveling reservation for a specific time and a specific day of the week, and may directly transmit the traveling start command signal instructing the performance of lawn mowing at an arbitrary time.

When the controller 190 of the moving robot 100 receives the traveling start command signal, the controller 190 establishes map information on the corresponding traveling area Zd. That is, the moving robot 100 obtains map information on the previously stored traveling area Zd, map information on the traveling area Zd obtained from the previous traveling, and a lawn mowing schedule, and based on theses, the moving robot 100 may transmit the information on the current traveling area Zd to the user terminal 400.

In this case, the controller 190 of the moving robot 100 may transmit environment information of the current traveling area Zd together. For example, the information on the density of the lawn and the length of the lawn may be transmitted together from the information on the traveling area Zd obtained in the previous traveling.

The user terminal 400 obtains environment information on the traveling area through the corresponding application, selects a current bumper sensitivity according to the obtained environment information, and transmits a control command according to the selected current bumper sensitivity (S220).

The controller 190 receives the control command on bumper sensitivity, and determines whether the bumper sensitivity received from the user terminal 400 is greater than the reference value (S230).

That is, when a bumper sensitivity table matched according to environment information is stored and the value of the bumper sensitivity on the table according to the environment information is defined as the reference value, in a case where the bumper sensitivity received from the user terminal 400 is greater than the reference value, the value of the bumper sensitivity received from the terminal 400 (S240) is set.

Therefore, in a case where the value of the bumper sensitivity needs to be increased because the environment information, that is, the length of the lawn is high, if the value of the control command obtained from the user terminal 400 is equal to or more than the reference value, the sensitivity is set to increase to the value of the control command, and the set value is stored (S250).

Next, the controller 190 controls the traveler 120 to perform pattern traveling according to the corresponding setting (S260), and when the pattern traveling is completed, transmits information on the completion signal to the user terminal 400 (S270).

Meanwhile, when the value of the bumper sensitivity received from the user terminal 400 is smaller than the reference value, the pattern traveling can be performed by controlling the set value with the matched reference value.

In this way, the control command on the bumper sensitivity is directly received from the user terminal 400 using the application, and thus, a direct control can be performed by the user terminal.

Figure 13:
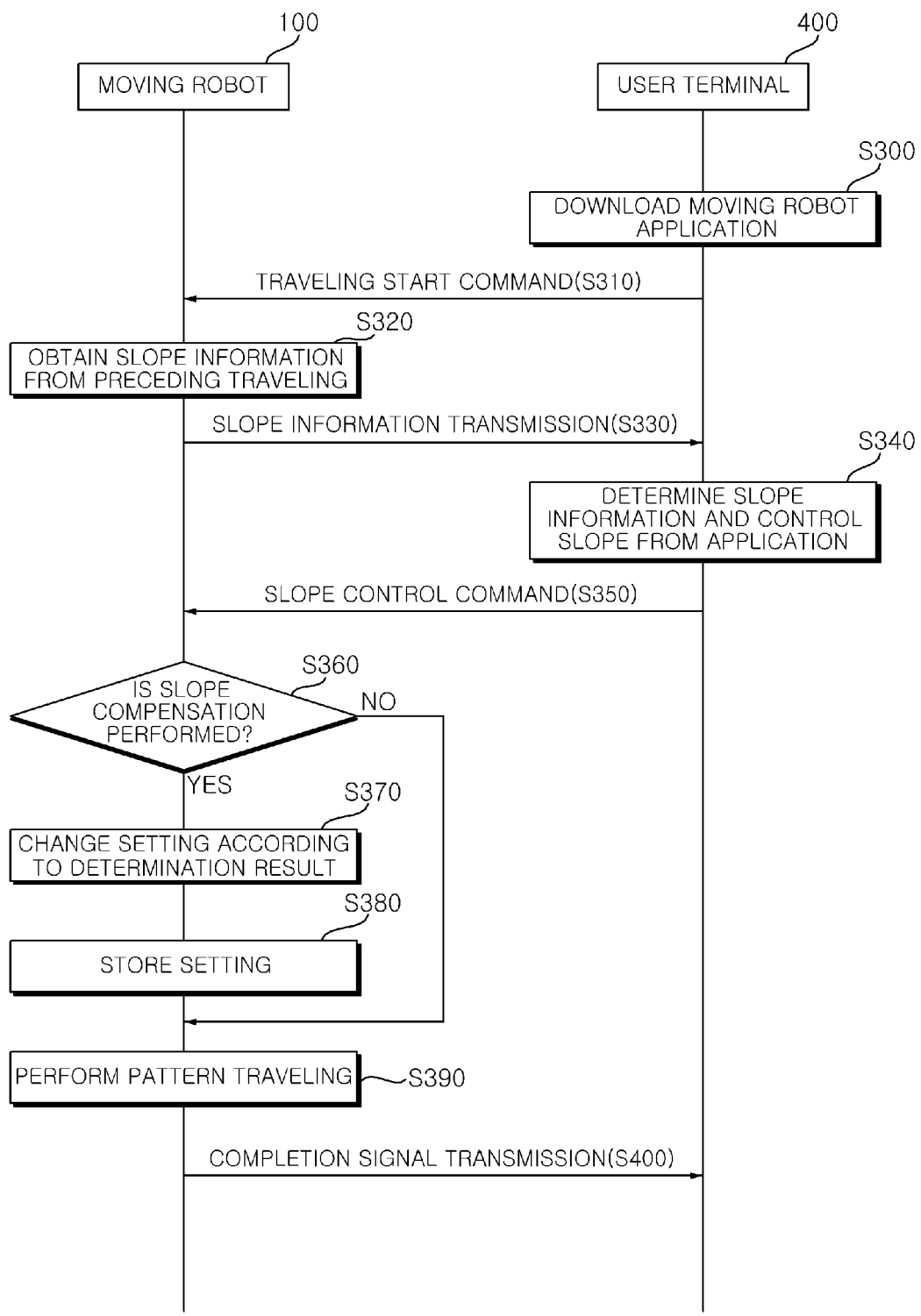
FIG. 13 is a flowchart illustrating a control method of a slope compensation value of a moving robot according to another embodiment of the present disclosure.

Hereinafter, a method of controlling slope compensation of the moving robot 100 will be described with reference to FIG. 13.

It is assumed that the moving robot 100 control application is downloaded and installed in the user terminal 400.

First, if the user terminal 400 downloads and installs the moving robot 100 control application (S300), the user may register the moving robot 100 in the application.

The communicator of the moving robot 100 receives the traveling start command signal for lawn mowing through the application from the user terminal 400 (S310).

The user terminal 400 may transmit the traveling start command signal through a traveling reservation for a specific time and a specific day of the week, and may directly transmit the traveling start command signal instructing the performance of lawn mowing at an arbitrary time.

When the controller 190 of the moving robot 100 receives the traveling start command signal, the controller 190 establishes map information on the corresponding traveling area Zd. That is, the moving robot 100 obtains the map information on the previously stored traveling area Zd, the map information on the traveling area Zd obtained from the previous traveling, and the lawn mowing schedule, and based on theses, the moving robot 100 may transmit the information on the current traveling area Zd to the user terminal 400.

Moreover, the moving robot 100 may obtain the gradient information through the preceding traveling (S320).

In this case, the controller 190 of the moving robot 100 may transmit the gradient information together with the environment information of the current traveling area Zd. For example, the gradient information may be transmitted together from the information on the traveling area Zd obtained in the previous traveling.

Figure 14A:
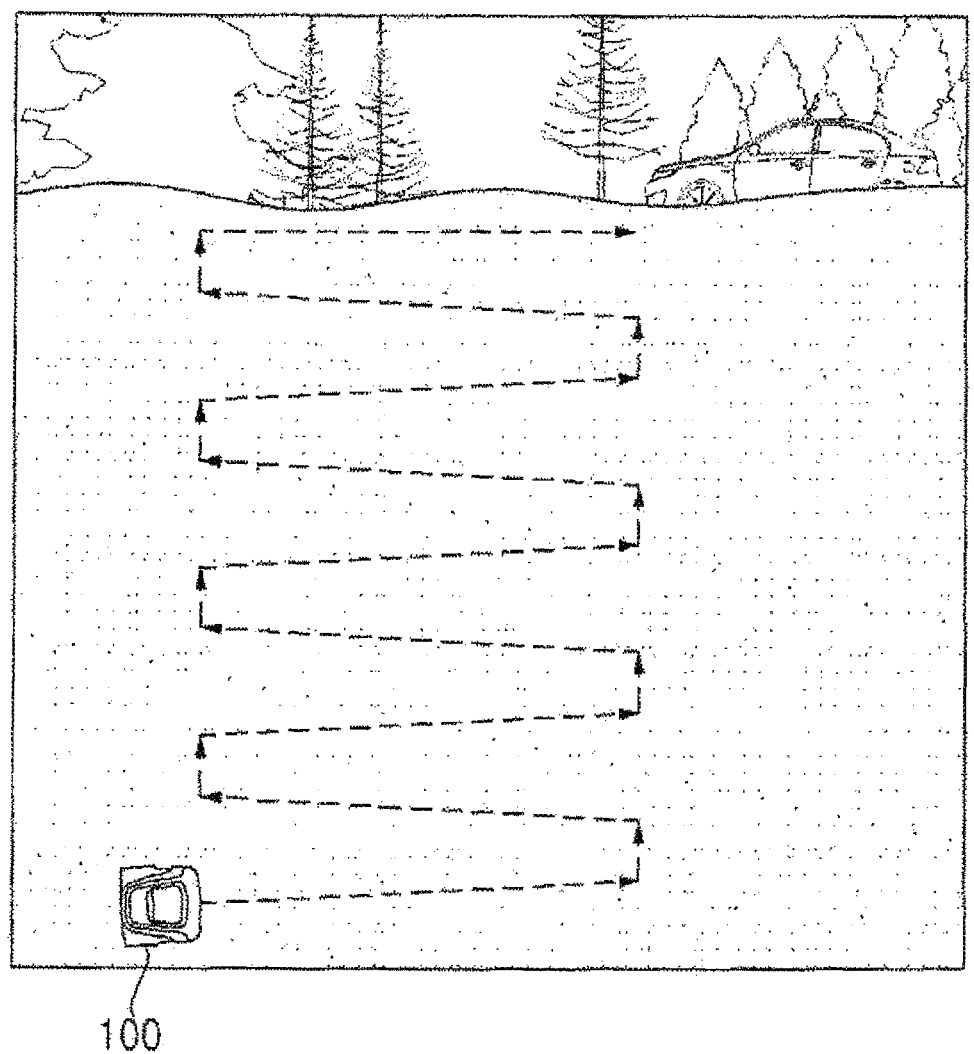
FIGS. 14A to 14C are views illustrating a screen of a user terminal provided by the moving robot system of FIG. 13.

That is, as illustrated in FIG. 14A, the pattern path of the traveling area Zd for the current gradient can be displayed on the user terminal 400.

The user terminal 400 obtains the environment information on the traveling area Zd through the corresponding application, reads the environment information, and selects the current gradient compensation value according to the read environment (S340). The user terminal 400 transmits a control command including the selected gradient compensation value (S350).

In this case, the user terminal 400 may receive a simulation image regarding the traveling path newly generated according to the slope compensation selected from the moving robot 100 for a selected gradient compensation value.

Figure 14B:
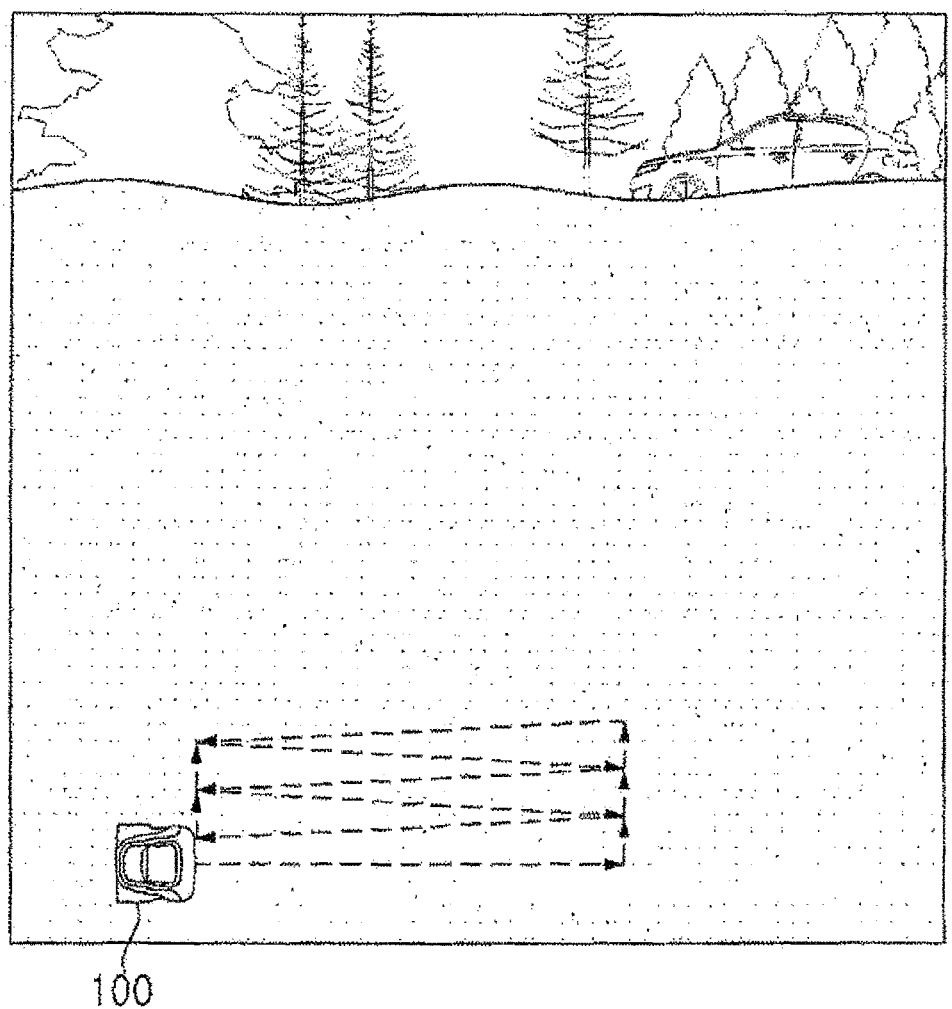
Figure 14C:
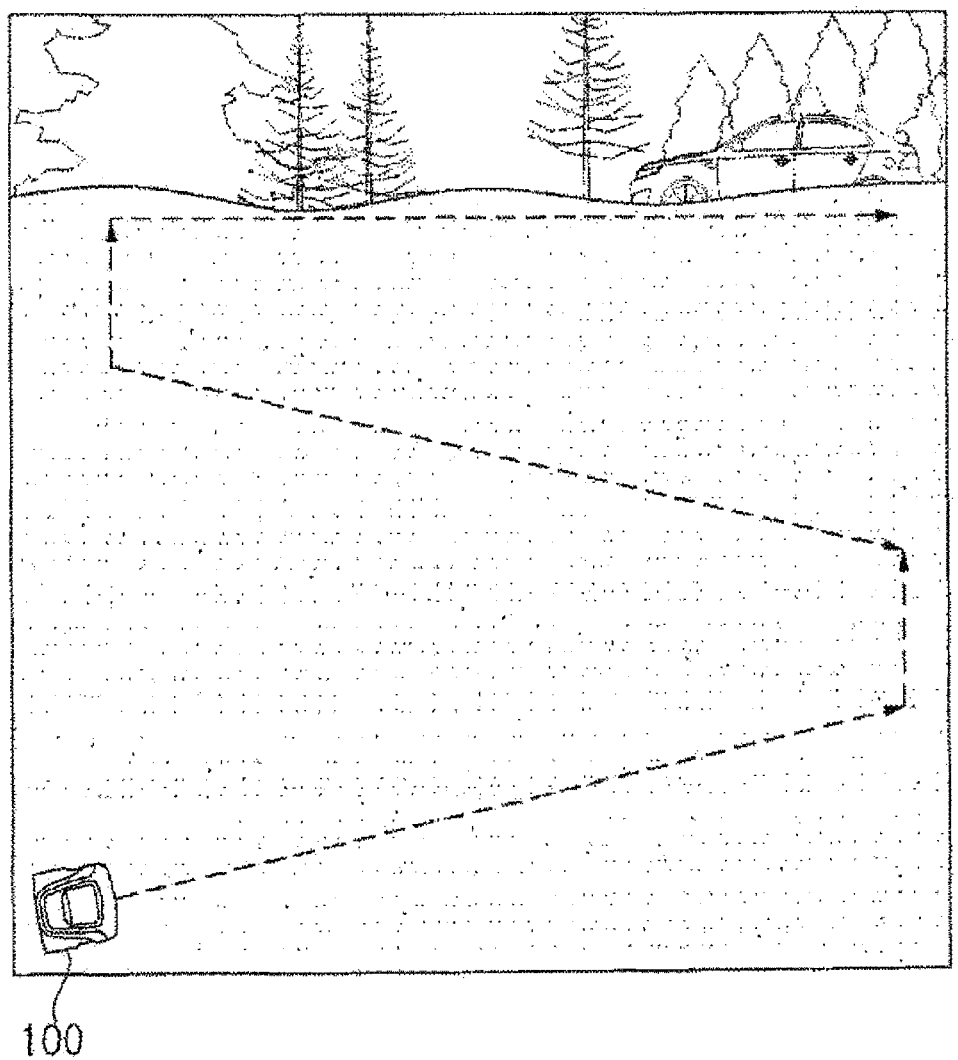

That is, when the user terminal 400 selects the compensation value to set the slope compensation value in the negative direction for the current gradient, the controller 190 of the moving robot 100 simulates a pattern path in which a pattern period is very short and the angle of the major axis is small as illustrated in FIG. 14B, and displays the simulated pattern path.

Meanwhile, when the user terminal 400 selects the compensation value to set the slope compensation value in the positive direction for the current gradient, the controller 190 of the moving robot 100 simulates a pattern path in which the pattern period is very long and which has an inclined angle to be performed in the slope upward direction, and displays the simulated pattern path.

The user terminal 400 selects a specific slope compensation value by referring to the simulation image of the pattern path, and transmits the slope control command according to the slope compensation value to the moving robot 100.

The controller 190 of the moving robot 100 receives the control command for the slope compensation, and determines whether the control command for the slope compensation received from the user terminal 400 performs the slope compensation with respect to the current gradient (S360).

When it is necessary to perform the slope compensation according to the slope compensation value by the user terminal 400, the controller 190 newly sets the slope compensation value to the corresponding slope compensation value (S370), and calculates the pattern path by reflecting the slope compensation value.

The controller 190 stores the newly set slope compensation value and the pattern path in the storage 166 (S380), and may control the traveler 120 according to the newly set compensation value and the pattern path to perform the pattern traveling (S390).

Next, when the pattern traveling is completed, the moving robot 100 transmits information on a completion signal to the user terminal 400 (S400).

In this way, the compensation value according to environment information and gradient is received directly from the user terminal 400, or the moving robot 100 directly calculates the compensation value by the preceding traveling and performs compensation to provide a setting value optimized for the traveling area.

In the above, it is described that the control command for the slope compensation and the bumper sensitivity is received through the user terminal 400. However, unlike this, the control command may be received through a button operation of the input unit 164 of the moving robot 100.

What is claimed is:

1. A moving robot comprising:
a body which forms an appearance;
a traveler which moves the body with respect to a traveling surface in a traveling area;
a sensing unit which acquires environment information of the traveling area; and
a controller which sets a parameter tailored to the traveling area according to the environment information and performs pattern traveling of the traveling area,
wherein the controller obtains information on a lawn condition in the traveling area as the environment information, sets a parameter for bumper sensitivity according to the information on the lawn condition, and performs the pattern driving.

2. The moving robot of claim 1, wherein the controller controls the traveler so that the traveler performs pattern traveling in a zigzag mode in which the moving robot alternately travels a major axis and a minor axis.

3. The moving robot of claim 2, wherein the controller includes slope information of the traveling surface, as the environment information.

4. The moving robot of claim 3, wherein the controller includes information on a lawn length and a lawn density, as information on the lawn condition.

5. The moving robot of claim 3, wherein the controller performs slope compensation so that the moving robot travels in a slope upward direction on the traveling surface based on the slope information.

6. The moving robot of claim 3, wherein the controller controls the traveler in the traveling area to perform a preceding traveling to obtain the environment information.

7. The moving robot of claim 1, wherein the controller sets the bumper sensitivity higher as the lawn density increases or the lawn length increases.

8. A moving robot system comprising:
a boundary wire which defines a traveling area;
a moving robot which includes a body which forms an appearance, a traveler which moves the body with respect to a traveling surface in the traveling area, a sensing unit which acquires environment information of the traveling area, and a controller which sets a parameter tailored to the traveling area according to the environment information and performs pattern traveling of the traveling area; and
a user terminal which transmits information on the parameter to the moving robot,
wherein the controller obtains information on a lawn condition in the traveling area as the environment information, sets a parameter for bumper sensitivity according to the information on the lawn condition, and performs the pattern driving.

9. The moving robot system of claim 8, wherein the controller controls the traveler so that the traveler performs pattern traveling in a zigzag mode in which the moving robot alternately travels a major axis and a minor axis.

10. The moving robot system of claim 9, wherein the user terminal stores an application for the moving robot.

11. The moving robot system of claim 10, wherein the controller transmits information on the traveling area to the user terminal.

12. The moving robot system of claim 11, wherein the information on the traveling area includes the environment information and gradient information on a sloped surface.

13. The moving robot system of claim 12, wherein the user terminal receives simulation of a pattern path according to a value of a slope compensation from the moving robot.

14. The moving robot system of claim 8, further comprising:
  a docking device to which the moving robot is docked to be charged,
  wherein one end of the traveling area is disposed to be adjacent to the docking device.

\* \* \* \* \*